(12) United States Patent
Smith et al.

(10) Patent No.: US 12,468,467 B2
(45) Date of Patent: Nov. 11, 2025

(54) SEQUENTIAL WRITE BASED DURABLE FILE SYSTEM

(71) Applicant: NetApp, Inc., Sunnyvale, CA (US)

(72) Inventors: Maxim Gerard Smith, Durham, NC (US); John William Haskins, Jr., Wake Forest, NC (US); David Anthony Slik, Northridge, CA (US); Keith Arnold Smith, Cambridge, MA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 15/224,255

(22) Filed: Jul. 29, 2016

(65) Prior Publication Data

US 2017/0123714 A1    May 4, 2017

Related U.S. Application Data

(63) Continuation-in-part of application No. 14/929,255, filed on Oct. 31, 2015, now abandoned.

(51) Int. Cl.
    *G06F 3/06*     (2006.01)
(52) U.S. Cl.
    CPC .......... *G06F 3/0643* (2013.01); *G06F 3/0619* (2013.01); *G06F 3/0676* (2013.01)
(58) Field of Classification Search
    USPC ........................................................ 707/600
    See application file for complete search history.

(56) References Cited

U.S. PATENT DOCUMENTS

| 4,543,654 | A | | 9/1985 | Jones |
|---|---|---|---|---|
| 5,271,012 | A | | 12/1993 | Blaum et al. |
| 5,297,258 | A | * | 3/1994 | Hale ................... G06F 11/1076     714/E11.034 |
| 5,687,365 | A | | 11/1997 | Velissaropoulos et al. |

(Continued)

FOREIGN PATENT DOCUMENTS

WO      2013152811 A1      10/2013

OTHER PUBLICATIONS

Yu Hua; SmartStore: A New Metadata Organization Paradigm with Semantic-Awareness for Next-Generation File Systems; 2009; ACM; pp. 1-12.*

(Continued)

*Primary Examiner* — Ann J Lo
*Assistant Examiner* — Jermaine A Mincey
(74) *Attorney, Agent, or Firm* — HAYNES AND BOONE, LLP

(57) ABSTRACT

A durable file system has been designed for storage devices that do not support write in place and/or that are susceptible to errors or failures. The durable file system also facilitates organization and access of large objects (e.g., gigabytes to terabytes in size). Regardless of whether target storage devices are configured with sequential write constraints, the durable file system writes object fragments across a set of sequences or ranges of storage units, such as logical blocks. The durable file system sequentially writes an object fragment into each storage unit sequence along with indexing information for the object fragments. In addition to writing the indexing information for the object fragments into the set of storage unit sequences, the durable file system updates the file system index with the object indexing information.

19 Claims, 12 Drawing Sheets

(56) References Cited

U.S. PATENT DOCUMENTS

| | | | |
|---|---|---|---|
| 5,963,962 A | 10/1999 | Hitz et al. | |
| 6,115,200 A | 9/2000 | Allen et al. | |
| 6,505,216 B1 | 1/2003 | Schutzman et al. | |
| 6,714,371 B1 | 3/2004 | Codilian | |
| 6,735,033 B1 | 5/2004 | Codilian et al. | |
| 7,177,248 B2 | 2/2007 | Kim et al. | |
| 7,333,282 B2 | 2/2008 | Iseri et al. | |
| 7,408,732 B2 | 8/2008 | Kisaka et al. | |
| 8,099,605 B1 | 1/2012 | Billsroem et al. | |
| 8,239,621 B2 | 8/2012 | Yamato | |
| 8,375,012 B1* | 2/2013 | Graefe | G06F 17/30327 707/696 |
| 8,566,520 B1 | 10/2013 | Bitner et al. | |
| 8,625,636 B2 | 1/2014 | Baptist et al. | |
| 8,650,159 B1* | 2/2014 | Zhang | G06F 11/1448 707/664 |
| 8,699,159 B1 | 4/2014 | Malina | |
| 8,768,983 B2 | 7/2014 | Kohlscheen et al. | |
| 8,819,259 B2 | 8/2014 | Zuckerman et al. | |
| 8,832,363 B1* | 9/2014 | Sundaram | G06F 3/0644 714/6.22 |
| 8,838,911 B1 | 9/2014 | Hubin et al. | |
| 8,949,449 B2 | 2/2015 | Zuckerman et al. | |
| 8,959,281 B1 | 2/2015 | Malina et al. | |
| 8,959,305 B1 | 2/2015 | Lecrone et al. | |
| 8,990,162 B1 | 3/2015 | Kushwah et al. | |
| 9,269,376 B1 | 2/2016 | Hess et al. | |
| 9,329,991 B2 | 5/2016 | Cohen et al. | |
| 9,348,601 B2* | 5/2016 | Forsyth | G06F 15/8007 |
| 9,361,301 B1 | 6/2016 | Bushman | |
| 9,471,366 B2 | 10/2016 | Bolte et al. | |
| 10,009,575 B1 | 6/2018 | Liu et al. | |
| 10,055,317 B2 | 8/2018 | Slik | |
| 10,379,742 B2 | 8/2019 | Smith et al. | |
| 10,514,984 B2 | 12/2019 | Slik et al. | |
| 2002/0095546 A1 | 7/2002 | Dimitri et al. | |
| 2002/0109693 A1* | 8/2002 | Champion | G09G 5/39 345/536 |
| 2003/0004947 A1* | 1/2003 | Coverston | G06F 16/10 |
| 2003/0105852 A1 | 6/2003 | Das et al. | |
| 2004/0153479 A1 | 8/2004 | Mikesell et al. | |
| 2004/0162940 A1 | 8/2004 | Yagisawa et al. | |
| 2004/0213149 A1 | 10/2004 | Mascolo | |
| 2005/0192932 A1 | 9/2005 | Kazar et al. | |
| 2006/0253651 A1 | 11/2006 | Inoue et al. | |
| 2006/0271339 A1 | 11/2006 | Fukada | |
| 2007/0104049 A1 | 5/2007 | Kim et al. | |
| 2007/0113004 A1 | 5/2007 | Sugimoto et al. | |
| 2007/0156405 A1 | 7/2007 | Schulz et al. | |
| 2007/0168336 A1* | 7/2007 | Ransil | G06F 16/958 |
| 2007/0177739 A1 | 8/2007 | Ganguly et al. | |
| 2007/0203927 A1 | 8/2007 | Cave et al. | |
| 2008/0126357 A1 | 5/2008 | Casanova et al. | |
| 2008/0151724 A1 | 6/2008 | Anderson et al. | |
| 2008/0201336 A1 | 8/2008 | Yamato | |
| 2008/0201401 A1 | 8/2008 | Pugh et al. | |
| 2008/0313398 A1 | 12/2008 | Koseki | |
| 2009/0100055 A1 | 4/2009 | Wang | |
| 2009/0154559 A1 | 6/2009 | Gardner | |
| 2009/0327840 A1 | 12/2009 | Moshayedi | |
| 2010/0030960 A1 | 2/2010 | Kamalavannan et al. | |
| 2010/0064166 A1 | 3/2010 | Dubnicki et al. | |
| 2010/0094921 A1 | 4/2010 | Roy et al. | |
| 2010/0094957 A1 | 4/2010 | Zuckerman et al. | |
| 2010/0095012 A1 | 4/2010 | Zuckerman et al. | |
| 2010/0095060 A1 | 4/2010 | Strange et al. | |
| 2010/0121913 A1* | 5/2010 | Maekawa | H04N 21/8456 709/203 |
| 2010/0162031 A1 | 6/2010 | Dodgson et al. | |
| 2010/0174968 A1 | 7/2010 | Charles et al. | |
| 2010/0185690 A1* | 7/2010 | Evans | G06F 17/30073 707/803 |
| 2010/0293354 A1 | 11/2010 | Perez et al. | |
| 2010/0306174 A1* | 12/2010 | Otani | G06F 11/1464 707/640 |
| 2010/0325345 A1 | 12/2010 | Ohno et al. | |
| 2011/0179224 A1* | 7/2011 | Rossi | G06F 11/2087 711/E12.001 |
| 2011/0191629 A1 | 8/2011 | Daikokuya et al. | |
| 2011/0296104 A1 | 12/2011 | Noda et al. | |
| 2012/0060072 A1 | 3/2012 | Simitci et al. | |
| 2012/0072689 A1 | 3/2012 | Van Kempen et al. | |
| 2012/0226886 A1 | 9/2012 | Hatfield et al. | |
| 2013/0054889 A1 | 2/2013 | Vaghani et al. | |
| 2013/0086340 A1 | 4/2013 | Fleming et al. | |
| 2013/0238235 A1 | 9/2013 | Kitchel et al. | |
| 2013/0282887 A1* | 10/2013 | Terayama | G06F 3/061 709/223 |
| 2013/0297905 A1 | 11/2013 | Yang et al. | |
| 2013/0346794 A1 | 12/2013 | Bartlett et al. | |
| 2014/0013046 A1 | 1/2014 | Corbett et al. | |
| 2014/0108707 A1 | 4/2014 | Nowoczynski et al. | |
| 2014/0207899 A1 | 7/2014 | Mark et al. | |
| 2014/0237024 A1 | 8/2014 | Chen et al. | |
| 2014/0297680 A1 | 10/2014 | Triou, Jr. et al. | |
| 2014/0331085 A1 | 11/2014 | Dhuse et al. | |
| 2014/0344532 A1 | 11/2014 | Lazier | |
| 2015/0067245 A1 | 3/2015 | Kruger | |
| 2015/0089185 A1* | 3/2015 | Brandyberry | G06F 11/2058 711/207 |
| 2015/0161163 A1 | 6/2015 | Cypher et al. | |
| 2015/0254008 A1 | 9/2015 | Tal et al. | |
| 2015/0256577 A1 | 9/2015 | Gutiérrez et al. | |
| 2015/0269964 A1 | 9/2015 | Fallone et al. | |
| 2015/0289013 A1* | 10/2015 | Nelson | H04H 60/31 725/19 |
| 2015/0293817 A1 | 10/2015 | Subramanian et al. | |
| 2015/0363126 A1 | 12/2015 | Frick | |
| 2015/0378825 A1 | 12/2015 | Resch | |
| 2016/0070617 A1 | 3/2016 | Algie et al. | |
| 2016/0179621 A1 | 6/2016 | Schirripa et al. | |
| 2016/0232168 A1 | 8/2016 | Lemoal | |
| 2016/0314043 A1 | 10/2016 | Slik | |
| 2017/0031752 A1 | 2/2017 | Cilfone et al. | |
| 2017/0060481 A1 | 3/2017 | Leggette et al. | |
| 2017/0109247 A1 | 4/2017 | Nakajima | |
| 2017/0123928 A1* | 5/2017 | Smith | G06F 11/1435 |
| 2017/0124104 A1 | 5/2017 | Smith et al. | |
| 2017/0178680 A1 | 6/2017 | Haskins, Jr. et al. | |
| 2019/0251996 A1 | 8/2019 | Haskins, Jr. et al. | |

OTHER PUBLICATIONS

Amer, et al., "Design Issue for a Shingled Write Disk System," 26th IEEE Symposium on Massive Storage Systems and Technologies (MSST 2010), May 2010,12 pages, retrieved on Oct. 20, 2015 from http://storageconference.us/2010/Papers/MSST/Amer.pdf.

Amer, et al., "Data Management and Layout for Shingled Magnetic Recording," IEEE Transactions on Magnetics, Oct. 2011, vol. 47, No. 10,pp. 3691-3697, retrieved on Oct. 15, 2015 from http://www.ssrc.ucsc.edu/Papers/amer-ieeetm11.pdf.

Dunn, et al., "Shingled Magnetic Recording Models, Standardization, and Applications," SNIA Education, Storage Networking Industry Association, , Sep. 16, 2014, 44 pages, retrieved on Oct. 21, 2015 from http://www.snia.org/sites/default/files/Dunn-Feldman_SNIA_Tutorial_Shingled_Magnetic_Recording-r7_Final.pdf.

Feldman, et al., "Shingled Magnetic Recording Areal Density Increase Requires New Data Management," USENIX, The Advanced Computing Systems Association, Jun. 2013, vol. 38, No. 3, pp. 22-30, retrieved on Oct. 20, 2015 from https://www.cs.cmu.edu/~garth/papers/05_feldman_022-030_final.pdf.

Gibson, et al., "Direction for Shingled-Write and Two-Dimensional Magnetic Recording System Architectures: Synergies with Solid-State Disks," Carnegie Mellon University, Parallel Data Lab, Technical Report CMU-PDL-09-104, May 2009, 2 pages, retrieved on Oct. 20, 2015 from http://www.pdl.cmu.edu/PDL-FTP/PDSI/CMU-PDL-09-104.pdf.

Gibson, et al., "Principles of Operation for Shingled Disk Devices," Carnegie Mellon University, Parallel Data Laboratory, CMU-PDL-

(56) References Cited

OTHER PUBLICATIONS 11-107, Apr. 2011, 9 pages, retrieved on Oct. 20, 2015 from http://www.pdl.cmu.edu/PDL-FTP/Storage/CMU-PDL-11-107.pdf.
Li, X., "Reliability Analysis of Deduplicated and Erasure-Coded Storage," ACM SIGMETRICS Performance Evaluation Review, vol. 38, No. 3, ACM New York, NY, Jan. 3, 2011, pp. 4-9.
Luo, "Implement Object Storage with SMR based Key-Value Store," 2015 Storage Developer Conference, Huawei Technologies Co., Sep. 2015, 29 pages, retrieved on Oct. 20, 2015 from http://www.snia.org/sites/default/files/SDC15_presentations/smr/QingchaoLuo_Implement_Object_Storage_SMR_Key-Value_Store.pdf.
Megans, "Spectra Logic Announces Breakthrough in Nearline Disk, ArcticBlue," SPECTA Logic, Boulder, CO, Oct. 15, 2015, 5 pages, retrieved on Oct. 20, 2015 from https://www.spectralogic.com/2015/10/15/spectra-logic-announces-breakthrough-in-nearline-disk-arcticblue/.
O'Reily; J., "Raid Vs. Erasure Coding", Network Computing, Jul. 14, 2014, 2 pages, retrieved on Apr. 1, 2016 from http://www.networkcomputing.com/storage/raid-vs-erasure-coding/1792588127.
Renzoni, R., "Wide Area Storage From Quantum," Quantum Corporation, 2012, 24 pages.
Seshadri S., "High Availability and Data Protection with EMC Isilon Scale-Out NAS," EMC Corporation, White Paper, Jun. 2015, 37 pages, retrieved on Oct. 5, 2015 from https://www.emc.com/collateral/hardware/white-papers/h10588-isilon-data-availability-protection-wp.pdf.
SMR Layout Optimisation for XFS, Mar. 2015, v0.2, 7 pages, retrieved on Oct. 15, 2015 from http://xfs.org/images/f/f6/Xfs-smr-structure-0.2.pdf.
Speciale P., "Scality RING: Scale Out File System & Hadoop over CDMI," Scality, Storage Developer Conference, Sep. 19-22, 2014, 26 pages, retrieved on Oct. 5, 2015 from http://www.snia.org/sites/default/files/PaulSpeciale_Hadoop_Ring.pdf.
Suresh, et al., "Shingled Magnetic Recording for Big Data Applications," Parallel Data Laboratory, Carnegie Mellon University, Pittsburg, PA, CMU-PDL-12-105, May 2012, 29 pages, retrieved on Oct. 20, 2015 from http://www.pdl.cmu.edu/PDL-FTP/FS/CMU-PDL-12-105.pdf.
International Search Report and Written Opinion for Application No. PCT/US2015/048177 mailed on Dec. 10, 2015, 8 pages.
RABIN "Efficient Dispersal of Information for Security, Load Balancing, and Fault Tolerance," Journal of the Association for Computing Machinery, vol. 36, No. 2, Apr. 1989, pp. 335-348.

\* cited by examiner

SEQUENTIAL WRITE BASED DURABLE FILE SYSTEM

BACKGROUND

The disclosure generally relates to the field of data management, and more particularly to a file system.

Consumer and businesses are both storing increasing amounts of data with third party service providers. Whether the third party service provider offers storage alone as a service or another service (e.g., image editing and sharing), the data is stored on storage remote from the client (i.e., the consumer or business) and managed, at least partly, by the third party service provider. This increasing demand for cloud storage has been accompanied by, at least, a resistance to increased price per gigabyte, if not a demand for less expensive storage devices. Accordingly, storage technology has increased the areal density of storage devices at a cost of device reliability instead of increased price. For instance, storage devices designed with shingled magnetic recording (SMR) technology increase areal density by increasing the number of tracks on a disk.

Increasing the number of tracks on a disk increases the areal density of a hard disk drive without requiring new read/write heads. Using the same read/write head technology avoids increased prices. But reliability is decreased because more tracks are squeezed onto a disk by overlapping the tracks. To overlap tracks, SMR disks are designed without guard spaces between tracks. Without the guard spaces, writes impact overlapping tracks and a disk is more sensitive to various errors (e.g., seek errors, wandering writes, vibrations, etc.).

BRIEF DESCRIPTION OF THE DRAWINGS

Embodiments of the disclosure may be better understood by referencing the accompanying drawings.

DESCRIPTION

Figure 1:
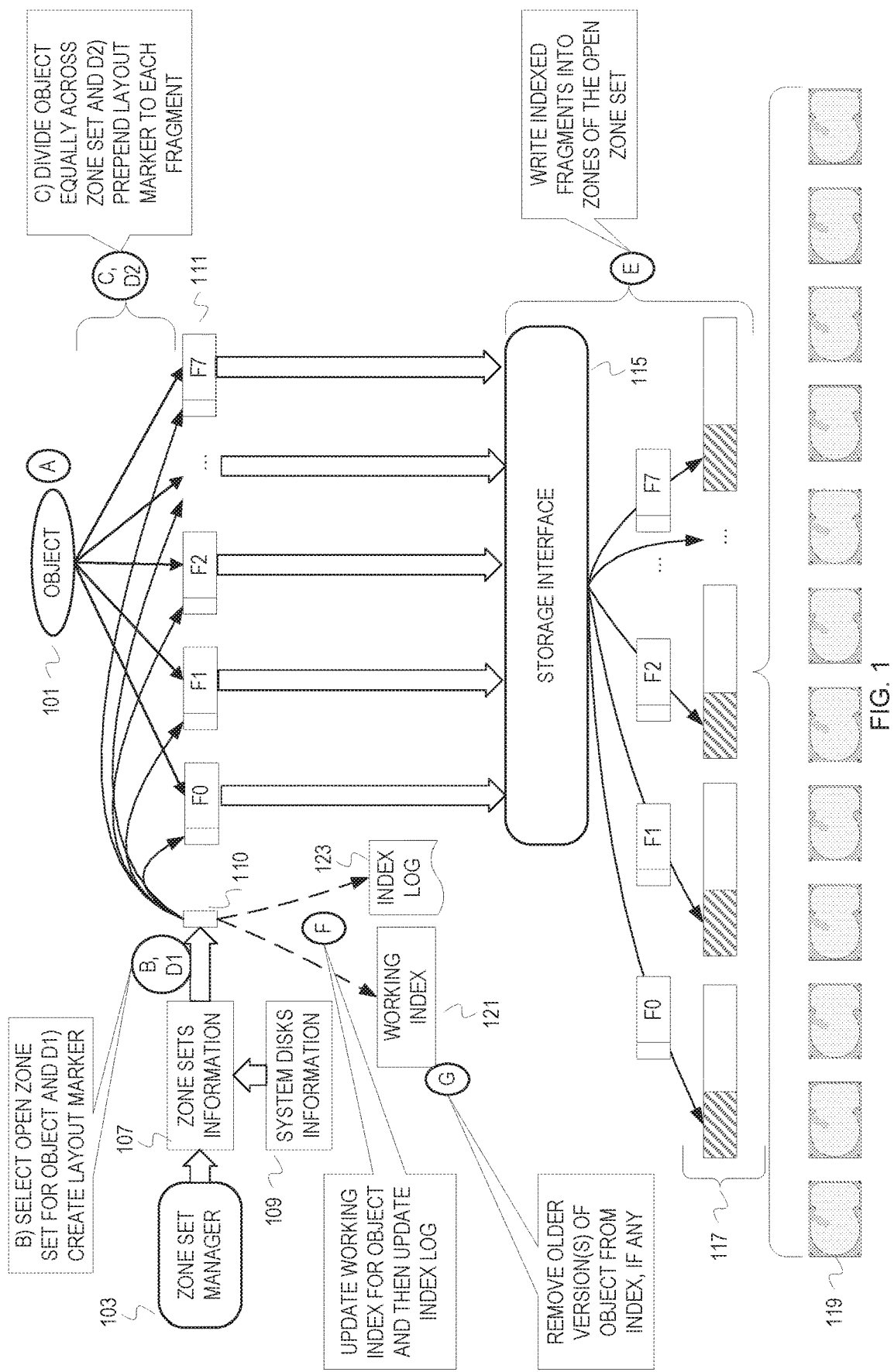
FIG. 1 depicts a logical view of a durable file system ingesting an object.

The description that follows includes example systems, methods, techniques, and program flows that embody embodiments of the disclosure. However, it is understood that this disclosure may be practiced without these specific details. For instance, this disclosure refers to shingled magnetic recording (SMR) storage in illustrative examples. But aspects of this disclosure can be applied to other storage devices. The disclosed durable file system can be established and maintained on storage devices that are not conducive to a write in place paradigm, storage devices that do not have sequential write constraints, and/or a storage pool with a number of relatively unreliable storage devices. In other instances, well-known instruction instances, protocols, structures and techniques have not been shown in detail in order not to obfuscate the description.

Overview

A durable file system has been designed for storage devices that do not support write in place and/or that are susceptible to errors or failures. The durable file system also facilitates organization and access of large objects (e.g., gigabytes to terabytes in size). Since the write of a large object often involves multiple write operations, the writing is also referred to as "ingesting." When ingesting an object, the durable file system writes the object with indexing information for the object to persistent storage across multiple zones that each map to an independently accessible storage medium (e.g., disks on different spindles). After persisting the indexing information with the object, the durable file system updates a file system index in working memory (e.g., non-volatile system memory) with the indexing information for the object. Writing the indexing information across multiple, concurrently accessible zones (referred to herein as a "zone set") prior to updating the file system index in working memory ("working index") aids the file system in withstanding interruptions and/or failures that impact the working memory and/or a few of the persistent storage devices. Since indexing information for each object is written across multiple storage devices, the working index can be reconstructed after an event that impacts the working index. Writing the indexing information with the object data in persistent storage also aids the durable file system in withstanding seek errors since the indexing information can be used to validate seeks.

In addition to durability, the writing of an object to a zone set influences file system efficiency. When writing to a zone set, the durable file system writes equally across the constituent zones. This allows the durable file system to locate object data with less metadata (i.e., less indexing information) because the object data is at a same offset or same logical block address within each of the constituent zones. The zone sets can also influence file system efficiency with set size. Ingest speed corresponds to the number of concurrently accessible zones in a set ("zone set width"). In other words, the zone set width corresponds to potential write concurrency.

The efficiency and durability of the durable file system extends to file system restoration and space reclamation. The durable file system can implement a delete of an object efficiently by writing a delete marker into each zone of a zone set and removing a corresponding entry from the working index. The durable file system can communicate the delete as complete to the client and delete the object at a later time during space reclamation. The delete marker indicates a time of the delete request and indicates the target object of the delete request. With this information about the delete written across a zone set, the index can be properly reconstructed after a failure regardless of the order that the file system encounters object indexing information and delete markers during a restore. As a counterpart to the efficiency of writing equally to each constituent zone of a zone set, the durable file system can efficiently reclaim storage space at zone set granularity since each constituent zone can be reclaimed concurrently when the zone set is chosen for space reclamation. Furthermore, space reclamation for the durable file system does not interfere with object availability because the object data is available throughout reclamation. The durable file system copies data of a live object to a different zone set and updates the file system index before reclaiming the target zone set (e.g., before resetting write pointers to the constituent zones).

Example Illustrations

FIG. 1 depicts a logical view of a durable file system ingesting an object. A durable file system accesses and organizes information on a group of storage devices 119. The durable file system interacts with the group of storage devices 119 via a storage interface 115 (e.g., a small computer system interface (SCSI) or an Advanced Host Controller Interface (AHCI)). The durable file system includes a zone set manager 103. The zone set manager 103 interacts with the group of storage devices 119 to obtain information about the group of storage devices 119 as system disks information 109. The system disks information 109 at least includes descriptors for the storage devices 119.

The group of storage devices 119 can be SMR storage devices. The storage devices 119 write to physical blocks. Although the physical blocks can conform to established block sizes (e.g., 512 byte blocks) with each block presented with a logical address (e.g., logical block address), SMR devices have larger physical blocks (4 KB) with an expectation to be larger. The group of storage devices 119 may be a class of storage devices with less endurance and less robustness (e.g., high bit error rates, shorter warranties, etc.). The group of storage devices 119 may have SMR device characteristics, such as constrained writes. For instance, the group of storage devices 119 may not allow random writes in sequential zones. SMR storage devices present sequences of sectors through multiple cylinders as zones. An SMR storage device initially writes into a zone at the beginning of the zone. To continue writing, the SMR storage device continues writing from where writing previously ended. This point at which a previous write ended is identified with a write pointer. As the SMR storage devices writes sequentially through a zone, the write pointer advances. If a disk has more than one sequential zone, the zones can be written independently of each other.

The zone set manager 103 also maintains information about zone sets 107 ("zone sets information"). The zone set manager 103 creates and maintains the zone sets information 107. The zone set manager 103 creates the zone sets information 103 based on the systems disk information 109 and file system configuration. The aforementioned storage device descriptors in the systems disk information 109 at least describe each currently operational one of the storage devices 119, and may also describe former storage devices or storage devices not currently accessible. The systems disk information 109 can include a number of storage devices in the system, and an array of disk descriptions. Each disk description includes a disk identifier created by the durable file system, a disk identifier external to the durable file system (e.g., a manufacturer specified globally unique identifier), and a disk status (e.g., offline, free, in a zone set, etc.). The file system can use a monotonically increasing value to assign disk identifiers. The zone set manager 103 uses the file system created identifier in the zone sets information 107 to map back to a disk's external identifier. The systems disk information 109 can also indicate additional information about the disks, such as capacity, sector size, zone sizes, health history, etc.

The zone sets information 107 includes state of each zone set and information about the zones that constitute each zone set. The state of a zone set is a state shared by the constituent zones. Examples of states include open, closed, empty, off-line, etc. Regardless of the moniker, the state information for a zone set conveys, at a minimum, whether the constituent zones can be written to or not. The constituent zone information at least includes number of constituent zones, file system disk identifiers that correspond to the constituent zones, and addressing information (e.g., logical block addresses) of the constituent zones. Since the durable file system forms a zone set from zones that can be accessed in parallel, each of the constituent zones will map to a different disk (e.g., different disk identifier). The file system obtains zone addressing information from the storage devices 119. The durable file system maintains the system disks information 109 and the zone sets information 107 as a data set or in a structure referred to as a "superblock." As with a traditional file system superblock, the durable file system superblock includes information for starting/booting/loading the durable file system.

FIG. 1 is annotated with a series of letters A-G. These letters represent operational stages. Although these stages are ordered for this example, the stages illustrate one example to aid in understanding this disclosure and should not be used to limit the claims. Subject matter falling within the scope of the claims can vary with respect to the order and some of the operations.

At stage A, the durable file system receives an object to ingest. The object can be received via any communication protocol associated with object based storage. For instance, the durable file system can receive the object from an application layer process that has received the object over a hypertext transfer protocol (HTTP) session, for example with a PUT command. The object can be any size, but the durable file system can ingest a large object (e.g., ranging from gigabytes to terabytes in size) which can be problematic for other file systems. The durable file system also associates a time with the object (i.e., creates a time stamp for the object). The durable file system uses this time stamp to distinguish the arrival of this object instance (or version) from any other instance (or version) of the object.

At stage B, the durable file system selects an open zone set for the object based on size of the object. The durable file system also selects the open zone set based on the zone sets information 107, which indicate states of zone sets. As previously mentioned, the state of "open" indicates that the durable file system can write to the zone set. The state of "closed" indicates that the durable file system cannot write to the zone unless a write pointer of the zone is reset. The write pointer is a pointer maintained by the storage devices that identifies where a write can continue from a previous write in the zone. For instance, a write pointer identifies a physical sector within a track that follows a physical sector in which data was previously written. Although a zoned disk may include random write zones, the durable file system is designed to satisfy a case of a storage device that lacks this feature. Thus, writes to a zone progress forward through the zone until the write pointer is reset to the beginning of the zone.

At stage C, the durable file system divides the object equally across the selected zone set. Dividing the object equally across the zone set allows the write pointers of the constituent zones to advance a same amount, which facilitates use of location information that is common across the constituent zones. Although the object can be written without protection, the durable file system likely encodes the object with a data protection technique (e.g., erasure coding, single parity, dual parity). The chosen data protection technique can influence zone set width or the zone set width can influence choice of data protection technique. Thus, the durable file system will divide the encoded object equally based on the number of constituent zones in the selected zone set, which corresponds to the data protection technique. The equal amounts of the object divided based on zone set width, whether the object was encoded or not, are referred to herein as object fragments. In some cases, an object may be divided into fragments ("fragmented") and then protection information added to some or all of the fragments. In other cases, protection information is added to the object and then fragmented. "Encoding an object into fragments" encompasses fragmenting an object and then adding protection information to fragments or adding protection to an object and then fragmenting. Regardless of the protection technique employed or not employed, the system generates multiple fragments from an object. FIG. 1 depicts 8 object fragments F0-F7 as object fragments 111.

At stage D1, the durable file system creates a layout marker 110 according to the selected zone set. A "layout marker" refers to indexing information organized according to a data structure for the indexing information. When written to storage, the layout marker can be used to determine layout of object fragments within a zone set. The layout marker at least includes a time stamp corresponding to creation of the layout marker, identification of the object (e.g., client defined object key or object name), identification of the zone set, time stamp of the object, and size of an individual one of the object fragments. The durable file system uses the object fragment size for reading, scanning, or seeking through a zone.

At stage D2, the durable file system prepends the layout marker to each of the object fragments. An object fragment with the prepended layout marker is referred to herein as an indexed fragment. With the layout marker prepended to an object fragment, the durable file system can use the layout markers to efficiently navigate zones. The durable file system can begin at the beginning of a zone, and read through layout markers without reading the intervening object fragments that are not of interest.

At stage E, the durable file system writes the indexed fragments into zones of the open zone set. The durable file system writes the indexed fragments via the storage interface 115 with messages, commands, or function invocations acceptable by the storage interface 115. FIG. 1 depicts the constituent zones of the selected zone set as zones 117. The durable file system writes each indexed fragment to a different one of the constituent zones 117. Since the disks corresponding to the constituent zones 117 are independently accessible (i.e., can be accessed in parallel), the writes can overlap in time.

At stage F, the durable file system updates a working index 121 for the object 101. The working index 121 is the index for the durable file system maintained in working memory. The durable file system updates the working index 121 with the indexing information in the layout marker 110 or updates the working index with the layout marker 110 (i.e., the indexing information as organized in the layout marker 110 data structure). The durable file system writes the layout marker 110 to persistent storage prior to updating the working index 121 to more quickly capture changes to the file system that can be recovered for restoring the file system. Restoring the file system includes restoring the working index 121 from the indexing information recorded into persistent storage.

At stage G, the durable file system updates the index log 123 with the indexing information (or the layout marker 110). The durable file system updates the index log 123 to allow for efficient reading of a zone of a closed zone set. The durable file system reserves space sufficient for the index log 123 in each zone of a zone set (temporarily disregarding special purpose zone sets). When the durable file system determines that constituent zones 117 reach this reserved space, the durable file system writes the index log 123 to each constituent zone. Thus, each constituent zone will have different parts of an object but have redundant copies of layout markers and index logs. After writing the index log 123 to each of the constituent zones 117, the zone set manager can close the zone set. The durable file system can locate the index log 123 (also referred to herein as a "layout digest") based on the write pointer that follows the layout digest and read the layout digest to determine contents of a zone set faster than reading layout markers separated by object fragments. Although FIG. 1 depicts a single index log 123, a durable file system can manage multiple open zone sets and maintain an index log for each open zone set.

At stage H, the durable file system removes references to older versions of the object 101 from the working index 121. The durable file system allows multiple versions of an object by using both a client defined object identifier and a time stamp to distinguish versions. The durable file system leverages the time stamp based object versions for several purposes that at least include avoiding losing objects, properly ordering overlapping object operations (e.g., overlapping writes or an overlapping read and write of different versions of an object), and consistent restoration of the durable file system.

Figure 2:
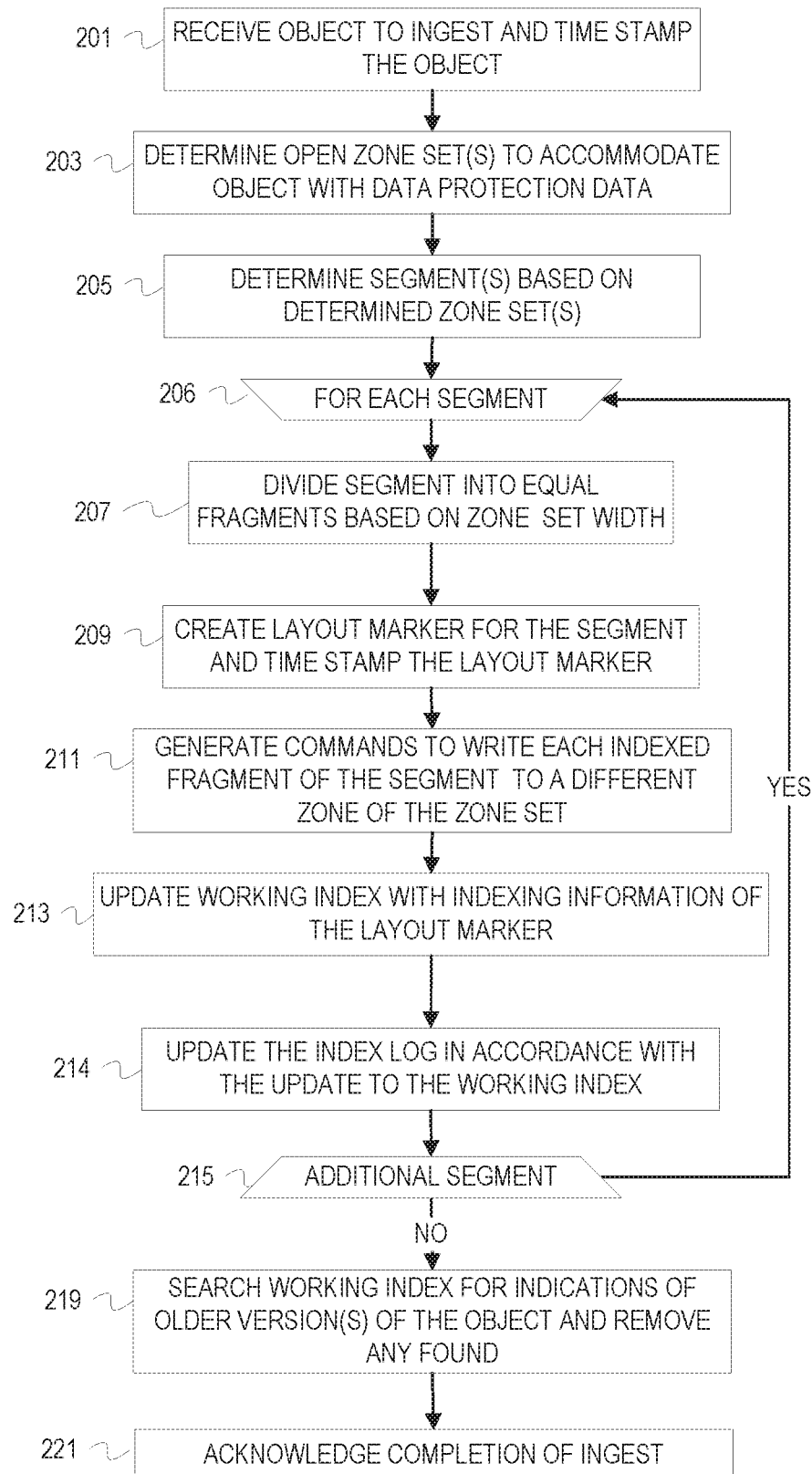
FIG. 2 depicts a flowchart of example operations for ingesting an object into a durable file system.
Figure 3:
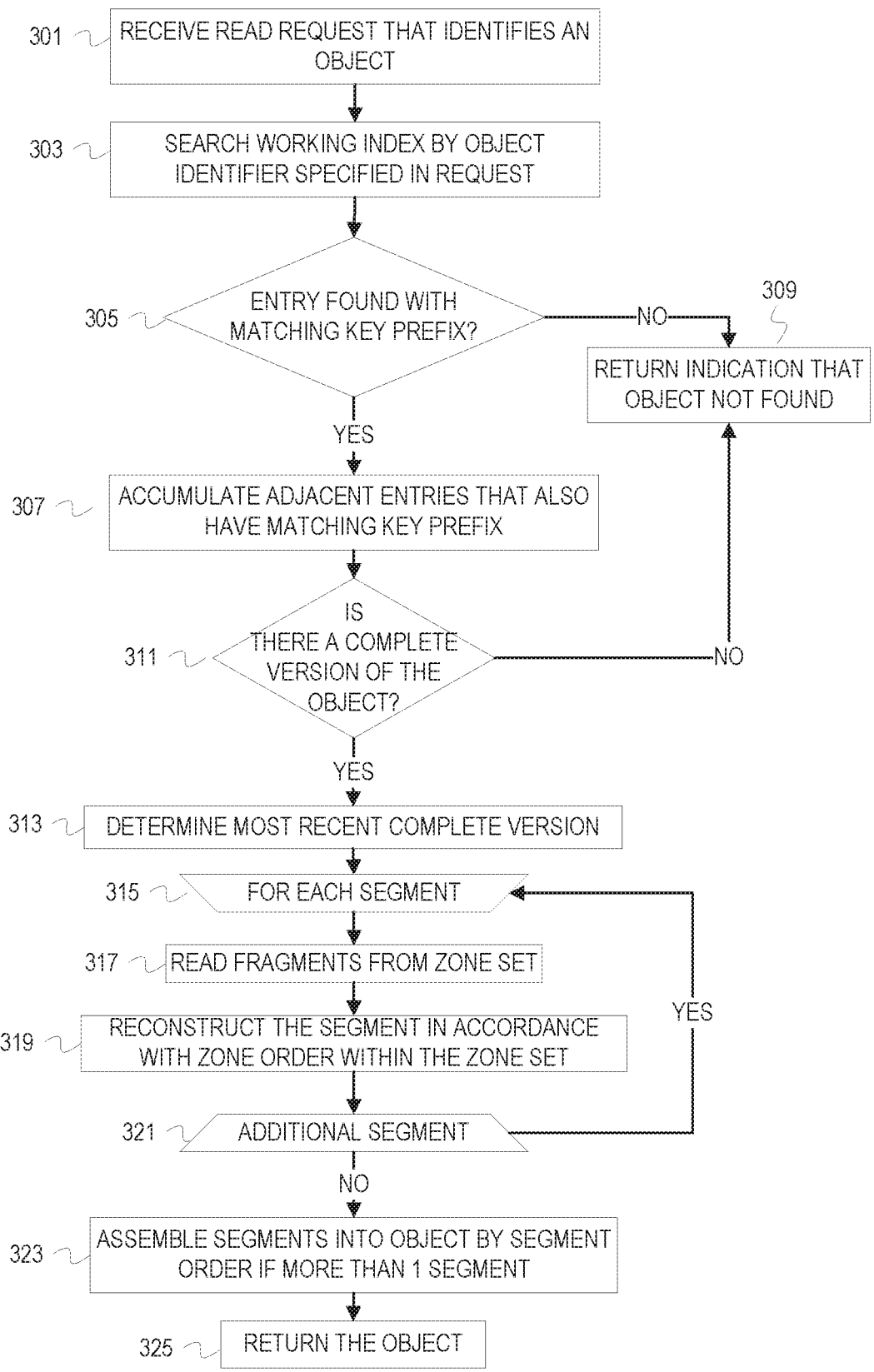
FIG. 3 depicts a flowchart of example operations for reading an object from a durable file system.
Figure 4:
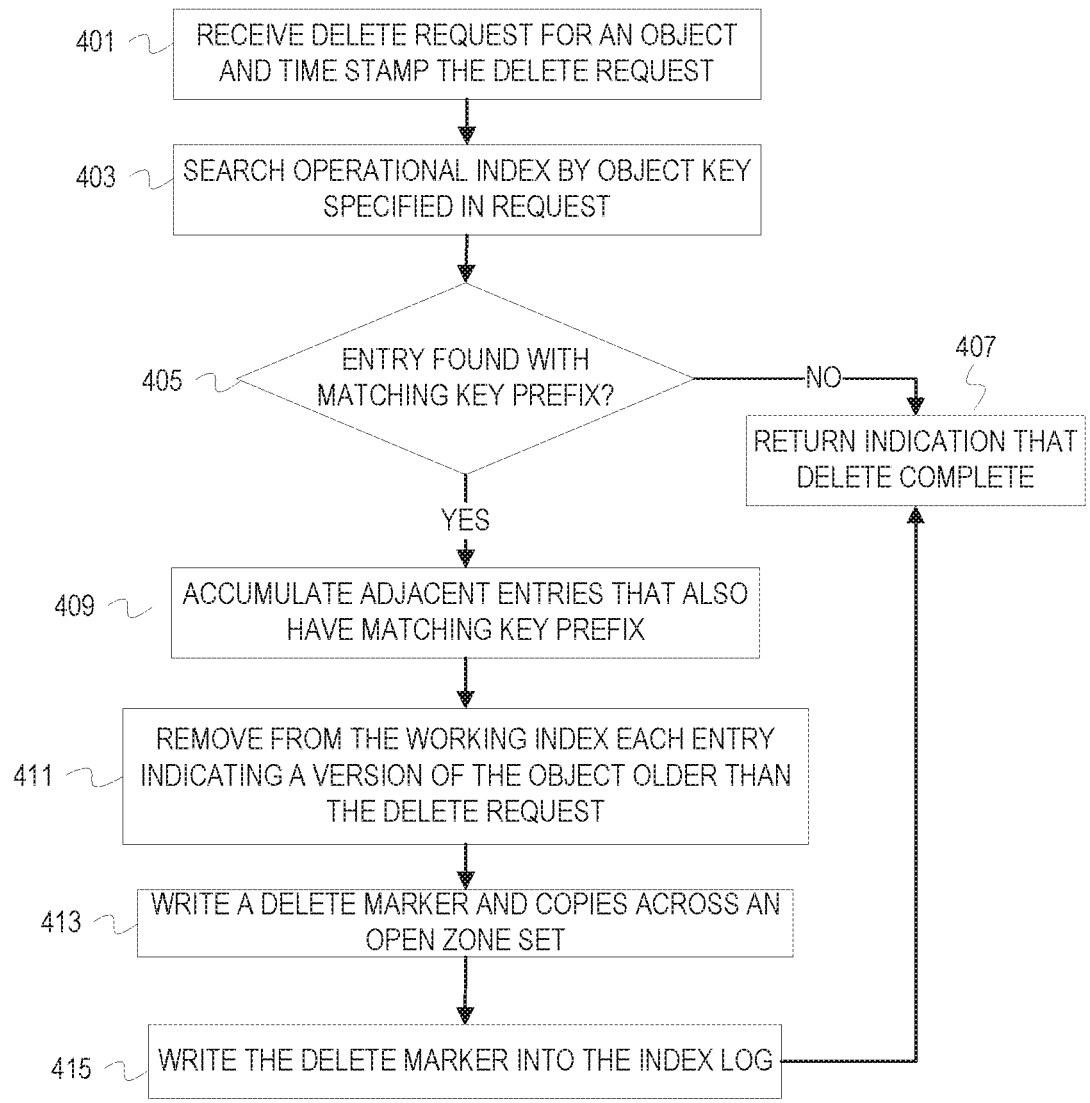
FIG. 4 depicts a flowchart of example operations for deleting an object from the durable file system.

FIG. 1 introduces the durable file system with only an example illustration of an object ingest. But the durable file system includes many other aspects and capabilities that are further explained below. For instance, FIG. 1 does not describe ingesting an object larger than a zone set. FIGS. 2-4 respectively depict flowcharts of example operations for ingesting an object, reading an object, and deleting an object.

Client Requests

FIG. 2 depicts a flowchart of example operations for ingesting an object into a durable file system. As illustrated by FIG. 1, object ingest is carried out in a manner that prioritizes persisting indexing information for an object before updating a file system index in working memory for durability of the file system. In addition, multiple copies of indexing information are written across a zone set to address the possibility of underlying storage devices that are more susceptible to write errors or failures.

At block 201, a durable file system receives an object to ingest and time stamps the object. The durable file system can receive the object from a process or application that has extracted and possibly assembled the object from multiple messages in accordance with a communications protocol. The durable file system may receive the object by receiving a reference to a buffer or memory location that hosts the object. The durable file system time stamps the object by recording a time associated with receipt of the object that is later incorporated into the layout marker(s) for the object. For instance, the durable file system can record a time when the durable file system receives indication of the object (e.g., a message or buffer pointer) or when then the durable file system loads the object into its working memory space. This time stamp distinguishes the received version of the object from any other version of the object. For example, a client may request a first write of an object "GB_FILE" and then update the object "GB_FILE." From the perspective of the client, the client has updated GB_FILE. From the perspective of the durable file system, two versions of GB_FILE have been ingested. In accordance with the durable file system namespace constraints, the second version replaces the first version. Since both versions can exist on the disks that back the durable file system, the durable file system distinguishes the versions with the time stamps for various aspects of the durable file system (e.g., determining a most recent version for restoring the working index).

At block 203, the durable file system determines one or more open zone sets that can accommodate the object with data protection data added. The durable file system may encode the object according to a data protection technique or may have received the object already encoded. For example, the object encoded for data protection is 5 gigabytes (GB). The durable file system can select a first open zone set that has a width of 8 zones, with each constituent zone being 256 megabytes (MB) in size. Thus, the first open zone set can accommodate 2 GB of the encoded object with some space reserved for a layout digest in each constituent zone. If available, the durable file system can select a second open zone set of a same width (i.e., 8 zones), but with larger zones (e.g., 512 MB zones) that can accommodate the remaining 3 GB of the encoded object, again with some space reserved for a layout digest in each of the second zone set constituent zones.

At block 205, the durable file system determines segments based on the determined zone set(s). If a single zone set can accommodate the object, then a segment and the object are synonymous. If a single zone set cannot accommodate the object, then the durable file system will divide the object across the zone sets before dividing the object across constituent zones. This disclosure uses "segment" to refer to a unit of an object divided across multiple zone sets as distinct from the object fragment previously established. Continuing from the preceding illustration, the durable file system can divide the object into a 2 GB segment and a 3 GB segment.

At block 206, the durable file system begins processing each segment. The durable file system can process each segment concurrently or serially.

At block 207, the durable file system divides the segment into equal fragments based on zone set width. For the 2 GB segment being written into the zone set of width 8 zones, the durable file system divides the 2 GB segment into 250 MB fragments. The durable file system can pad a fragment that is smaller than the other fragments. The durable file system can use symbols recognized as padding, or use the total size of the object segment to recognize and discard padding when reassembling an object.

At block 209, the durable file system creates a layout marker for the segment and time stamps the layout marker. As previously mentioned, the durable file system creates the layout marker with identification of the object, time stamp of the object, time stamp of the layout marker, zone set identifier, and fragment size. With multiple segments, the durable file system also creates the layout marker with identification of the segment (e.g., an ordered segment number) and total number of segments. The durable file system can also create the layout marker with any one or more of size of the segment, size of the object, size of the layout marker, addressing information for the layout marker (e.g., logical block address corresponding to the write pointer of the target zone set), content type of the following fragment, checksum of the layout marker, and checksum of the following fragment. The addressing information for the layout marker can be used to detect seek errors. Information about the constituent zones can resolve back to disk addressing information supplied from the disks, for example logical block numbers, that map to the zones. This information can be compared against the addressing information for the seek. The fragment content type can indicate that the fragment is for an object, an index snapshot, or the superblock. Although distinct pieces of information, the durable file system can record (e.g., concatenate) a client defined object identifier, an object time stamp, and a segment identifier as a key for an object fragment. The durable file system can use the object fragment key to determine whether an object fragment is valid according to the working index.

At block 211, the durable file system generates commands to write each indexed fragment of the segment to a different zone of the zone set. If a zone set is created with independently accessible zones, then the durable file system can concurrently write the segment fragments across the zone set. The durable file system can generate the commands or function calls to write the segment fragments in a manner that aligns order of the segment fragments with order of the zones in the zone set. The durable file system can write the segment fragments to (and read from) constituent zones according to the order the zones occur in an array, for example, that identifies the zones in the zone set. Thus, the durable file system can disregard zone identifiers with respect to arrangement of segment fragments, although the durable file system could use zone identifiers when determining arrangement of segment fragments. In addition to the performance benefit of writing segment fragments concurrently, writing the segment fragments with layout markers persists indexing information without the cost of an additional write operation.

At block 213, the durable file system updates the working index with the indexing information of the layout marker. The durable file system uses the indexing information in the working index to determine the location of objects. The durable file system can more efficiently access indexing information in working memory. The durable file system uses the indexing information stored in persistent storage for restoring the working index.

At block 214, the durable file system updates the index log for the zone set in accordance with the update to the working index. A durable file system does not necessarily use index logs, but a durable file system can use an index log to efficiently determine contents of a closed zone set as already discussed, as well as efficiently restore a working index as will be discussed.

At block 215, the durable file system determines whether there is another segment of the object to process. The durable file system can initialize a counter with a number of segments and decrement the counter as it finishes processing each segment. The durable file system can maintain a buffer or buffers in working memory and continue until the buffer or buffers are empty. If all segments have been processed, then the control continues to block 217. Otherwise, control returns to block 206 where the durable file system begins processing the next segment.

At block 219, the durable file system searches the working index for entries that indicate any older versions of the object. As previously mentioned, the working index uses an object identifier, object time stamp, and segment identifier as an object fragment key. Since all fragments of a segment are at the same offset within zones of a zone set, the fragment key can be considered the segment key. Using the object identifier as a prefix, the durable file system searches the working index for keys with a prefix that matches the object identifier. For each resulting entry, the durable file system determines whether the time stamp incorporated into the fragment/segment key is older than the time stamp of the currently ingested object. If so, then the entries are removed from the working index. Removal of these entries from the working index ensures that an older version of an object will not be retrieved by a subsequent retrieval operation (e.g., a read or GET). The durable file system can reclaim the space occupied by the older object version at a later time.

At block 221, the durable file system acknowledges completion of the ingesting of the object. For instance, the durable file system can create a message that identifies the object and includes a flag that represents completion of the ingest. The durable file system can pass this message to a process or application that processes the message in accordance with a communication protocol for sending to the client. In some cases, the durable file system generates an acknowledgement type of message for transmission to the client and identifies the object in the message.

FIG. 3 depicts a flowchart of example operations for reading an object from a durable file system. Reading an object from the durable file system accounts for different versions of an object, fragmentation of objects, and the possibility that an object may be partly ingested.

At block 301, the durable file system receives a read request that identifies an object. Another application or process may have received a message with a GET command, for example. This read request is conveyed to the durable file system, for example by inter-process communication. As another example, the durable file system may receive a file system read command generated in response to receipt of an object read command, such as the aforementioned GET command.

At block 303, the durable file system searches the working index by the object identifier specified in the read request. The read request will indicate a client defined object identifier. Since the durable file system uses the client defined object identifier as an initial part of a segment key, the durable file system searches the working index for any segment keys that begin with the object identifier.

At block 305, the durable file system determines whether an entry is found with a matching segment key prefix. If not, then control flows to block 309. If a matching entry is found, then control flows to block 307.

At block 309, the durable file system returns an indication that the object was not found.

At block 307, the durable file system accumulates adjacent entries that also have a matching key prefix. A working index can be organized as a tree (e.g., N-ary tree) with leaf entries having same key prefixes adjacent to each other, and with reference fields to allow access to the adjacent leaf entries. The durable file system can then efficiently find the leaf entries with the matching prefix key.

At block 311, the durable file system determines if there is a complete version of the object (i.e., determines if all segments of the object are present). The durable file system can examine all accumulated entries that indicate a same object version (i.e., same object identifier and same object time stamp). For each set of entries indicating a same object version, the durable file system can determine whether all segments are indicated with the indexing information in the entries (e.g., using total number of segments and segment identifiers). If there is no complete version of the object, then control flows to block 309. If there is at least one complete version of the object, then control flows to block 313.

At block 313, the durable file system determines the most recent version of the complete objects. The durable file system can use the segment keys to determine the most recent version of an object since the segment keys include the object time stamp.

At block 315, the durable file system begins processing each segment of the most recent complete object. The durable file system uses the leaf entries for the most recent complete object.

At block 317, the durable file system reads the fragments from the zone set. The durable file system determines a zone set identifier and offset from the leaf entries. With this information and the segment key, the durable file system reads the fragments from the zone set.

At block 319, the durable file system reconstructs the segment in accordance with zone order of the zone set. As previously discussed, the durable file system can determine an order for the fragments to reconstruct the segment based on an order of constituent zones as specified by zone set information. Furthermore, segment reconstruction may involve recovering fragments in accordance with a data protection technique (e.g., parity, erasure coding, etc.) that was used for the segment.

At block 321, the durable file system determines whether there is an additional segment to process. If so, then control returns to block 315. Otherwise, control continues to block 323.

At block 323, the durable file system assembles the segments together in an order identified by the segment identifiers if there is more than one segment for the object. If the durable file system divided an object into segments, the durable file system used segment identifiers for guiding object reconstruction.

At block 325, the durable file system returns the object to the client. The durable file system may return the object to the client via one or more intermediary applications/processes.

FIG. 4 depicts a flowchart of example operations for deleting an object from the durable file system. The durable file system efficiently deletes an object by removing reference to the object from the working index. The object itself continues as invalid or dead data until the occupied space is reclaimed. Regardless, the durable file system can quickly communicate completion of the delete request to the client. The durable file system can use a delete marker to persist the delete.

At block 401, the durable file system receives a delete request for an object and time stamps the delete request. For example, the durable file system receives an indication of a DELETE command or a file system command corresponding to a DELETE command. The durable file system records a time of receipt of the delete request to time stamp the delete request. The durable file system uses the delete request time stamp to ensure proper restoration of the working index. The delete request time stamp allows the durable file system to ensure that a delete processed in proper time order against any writes based on an object time stamp.

At block 403, the durable file system searches the working index by the object identifier specified in the delete request. The delete request will indicate a client defined object identifier. The durable file system searches the working index for any segment keys that begin with the object identifier.

At block 405, the durable file system determines whether an entry is found with a matching segment key prefix. If not, then control flows to block 407. If a matching entry is found, then control flows to block 409.

At block 407, the durable file system returns an indication that the delete is complete. The delete can be indicated as successful if the identified object was found and removed to prevent finding the object again. The delete may also be indicated as successful even if no such object was found.

At block 409, the durable file system accumulates adjacent leaf entries that also have a matching key prefix. As previously mentioned, a working index can be organized with leaf entries having same key prefixes adjacent to each other, and with reference fields to allow access to the adjacent leaf entries. The durable file system can then efficiently find the leaf entries with the matching prefix key.

At block 411, the durable file system removes from the working index each leaf entry indicating a version of the object older than the delete request. The durable file system extracts object time stamps from the segment keys to compare against the delete request time stamp. With this comparison, the durable file system can determine segments referenced by the leaf entries that are older than the delete request and remove them from the working index.

At block 413, the durable file system writes a delete marker and copies across an open zone set. The durable file system selects an open zone set, and writes the delete marker in each constituent zone of the selected open zone set. The delete marker includes the client defined object identifier and the time stamp of the delete request. The delete marker can also indicate a size of the delete marker. The durable file system uses the delete marker to record the delete request into persistent storage. This allows the durable file system to properly reflect the delete request in a restored index.

At block 415, the durable file system writes the delete marker into the index log of the selected zone set. As with other content, the index log can be used to efficiently ascertain any delete markers written into a zone set.

Durable File System Superblock

Since the superblock includes data for starting the durable file system (e.g., from a cold start), the superblock is stored at predefined locations. The durable file system is programmed to search for the superblock at the predefined locations. For example, the first zone on each disk can be reserved for the superblock and redundant superblock copies. The valid superblock resides at the last block written in one of these reserved zones. A superblock for the durable file system will typically occupy multiple physical sectors but less than a zone. If the disks in a system have an average of 10 TB of space, reserving one 256 MB zone on each disk consumes approximately 0.003% of system capacity. Since changes to a superblock will be more frequent than writes of objects, a durable file system can employ a distribution mechanism with redundancies to ensure availability of the superblock while also distributing wear from the frequent writes. For example, assuming zone 0 of each disk is reserved for a superblock instance, the durable file system can write superblock snapshots to zone 0 of all disks in a storage system in a round robin fashion before revisiting any of the disks a second time to write a superblock instance into zone 0.

Figure 5:
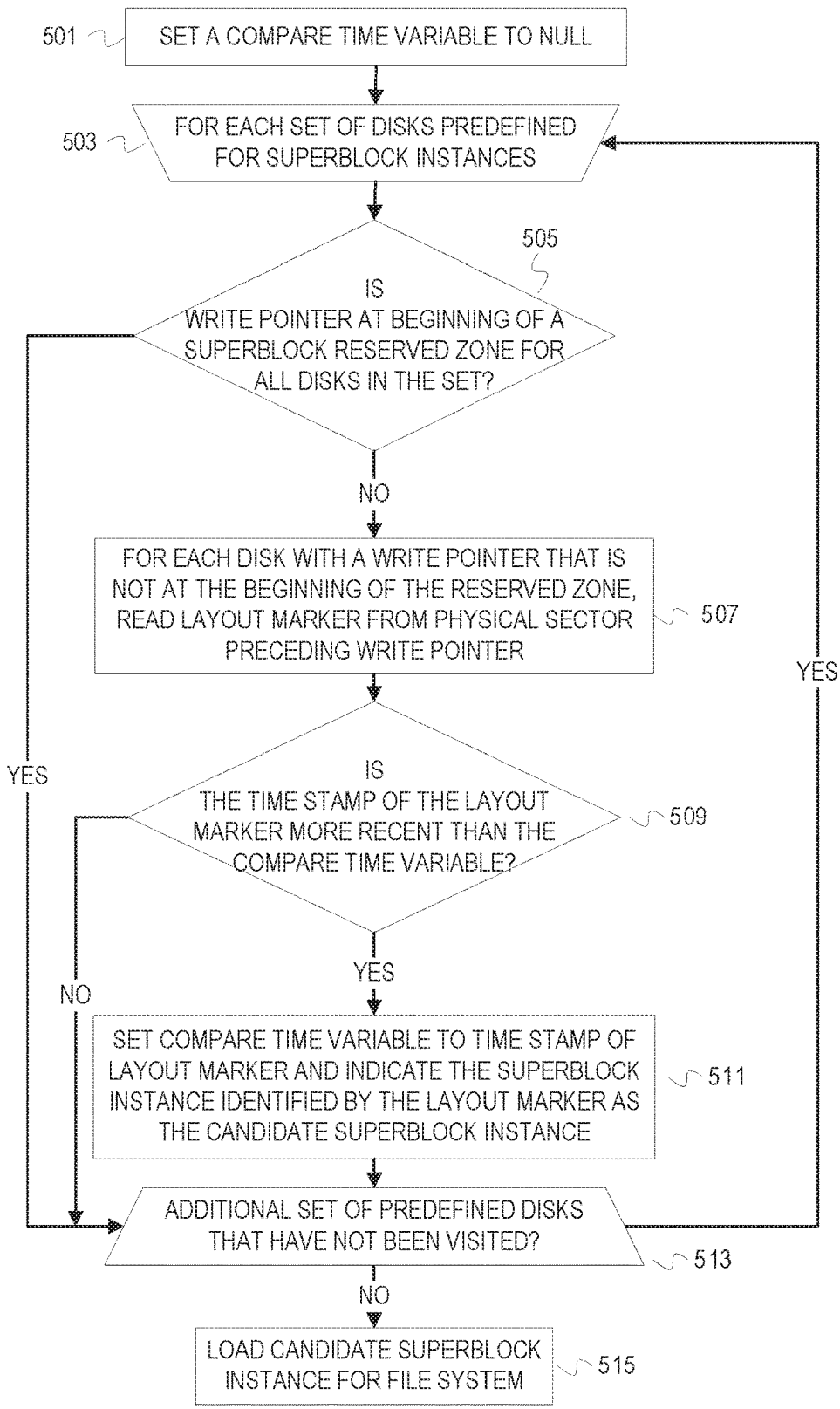
FIG. 5 depicts a flowchart of example operations to read the superblock from the predefined zones.

FIG. 5 depicts a flowchart of example operations to read the superblock from the predefined zones. The superblock is expected to be many physical sectors in size, though smaller than a zone. The durable file system prepends a layout marker and appends a layout marker to the superblock. The ending layout marker permits locating the beginning of the superblock from its end. The superblock end is located at the write point of its zone. On a cold start, the durable file system reads the ending layout marker from the last sector of each disk's superblock zone and takes the one with the latest timestamp as identifying the valid superblock.

At block 501, the durable file system start code sets a compare time variable to a null value or base time value. The compare time variable is used to determine a most recent superblock instance, although other techniques can be used.

At block 503, the durable file system starts processing each set of storage devices predefined for superblock instances. For example, the durable file system start up code can be hard coded to start searching at predefined storage devices. If the durable file system is programmed to maintain x copies of the superblock in a system with n storage devices, then the durable file system starts searching at a first storage device or an arbitrary storage device within each of x sets of the storage devices.

At block 505, the durable file system determines whether the write pointers are at the beginning of reserved superblock zones of the storage device set. If the write pointers are at the beginning, then the superblock zones are either empty or the write pointers have been reset. If the write pointers are at the beginning, then control flows to block 513. Otherwise, control flows to block 507 since the superblock zones may have a valid superblock.

At block 507, the durable file system reads an ending layout marker from a physical sector preceding a write pointer from each disk with a write pointer that is not at the beginning of the superblock zone. Control flows from block 507 to block 509.

At block 509, the durable file system determines whether the layout marker is more recent than the compare time variable based on the time stamp of the layout marker. The durable file system searches through discovered superblock instances for a most current superblock instance. If the layout marker is more recent than the compare time variable, then control flows to block 511. Otherwise, control flows to block 513.

At block 511, the durable file system sets the compare time variable to the layout marker time stamp. The durable file system also indicates the superblock instance identified by the layout marker as a candidate superblock.

At block 513, the durable file system determines whether there is another set of predefined storage devices. If so, control flows back to block 503. Otherwise, control flows to block 515.

At block 515, the durable file system loads the candidate superblock instance to start the file system.

Figure 6:
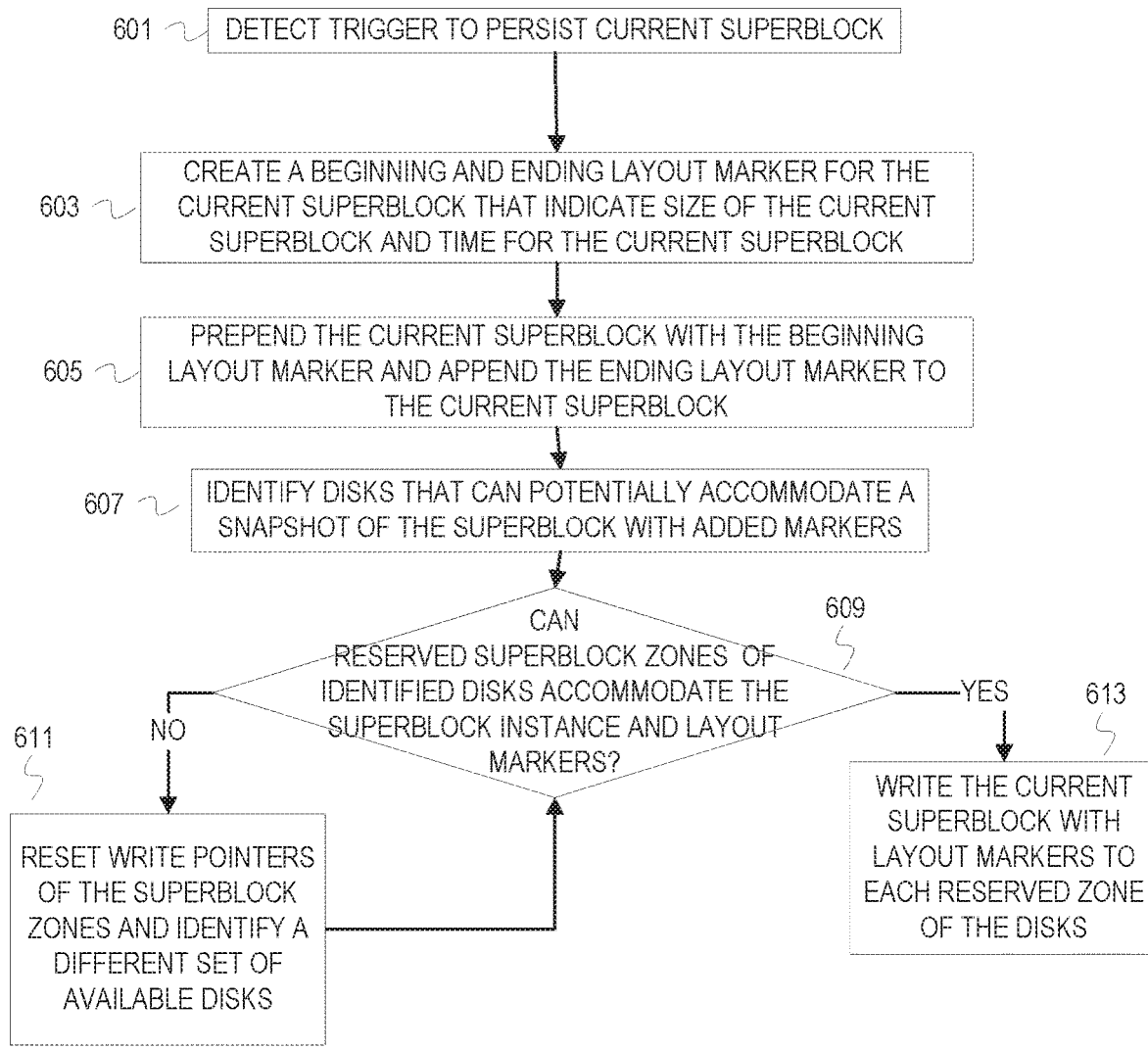
FIG. 6 depicts a flowchart of example operations to persist the superblock when it changes.

FIG. 6 depicts a flowchart of example operations to persist the superblock whenever particular information in the superblock changes. The durable file system persists the superblock for file system restoration.

At block 601, the durable file system detects a trigger to persist the current superblock. Examples of triggers for a taking a snapshot of the superblock include a change to the systems disk information (e.g., a storage device is added, replaced, or removed), a change to the zone set information (e.g., change in state of a zone set, change in zone set membership, etc.), and a snapshot being taken of the index. These changes are captured and persisted for file system restoration.

At block 603, the durable file system creates a beginning layout marker and an ending layout marker for the superblock to be persisted. These layout markers both indicate the size of the superblock and a creation time of the layout markers.

At block 605, the durable file system prepends the beginning layout marker to the superblock and appends the ending layout marker to the superblock.

At block 607, the durable file system identifies disks that can potentially accommodate a snapshot of the current superblock with added markers. The durable file system can record information that identifies these disks when the previous superblock snapshot was loaded. These identified disks are distinct from those that host the previous superblock snapshot. The durable file system uses these identified disks to start searching for superblock zones to host the current superblock.

At block 609, the durable file system determines whether the reserved superblock zones of the identified disks can accommodate the current superblock instance with the added beginning and ending layout markers. If the current superblock instance can be accommodated, then control flows to block 613. If it cannot, then control flows to block 611.

At block 611, the durable file system resets the write pointers of the superblock zones that could not accommodate the current superblock instance. Since these zones are reserved for superblock instances and these zones cannot accommodate the current superblock instance, these superblock zones are reset so they can accommodate a superblock instance when encountered again. After resetting the write pointers, the durable file system identifies a different set of disks to host the current superblock instance. Control then flows back to block 609.

At block 613, the durable file system writes the current superblock instance with the prepended and appended layout markers to the superblock zones of the identified disks. Thus, each identified superblock zone will host a copy of the superblock snapshot.

Durable File System Index

This disclosure has already described use of the durable file system index as an index of object segment keys. A segment key can be a tuple of a client defined object identifier, the object time stamp, and a segment identifier. The segment key resolves to leaf entries with location information of the corresponding object segment within a zone set (i.e., a zone set identifier and an offset within the zone set). This zone set location information resolves to locations in storage with the zone set information maintained in the superblock.

For efficient access, the index is organized in fixed size blocks. Instead of referencing entries by memory addresses, entries can be accessed in multiples of offsets by level within the index. The durable file system can cache index entries of accessed objects in the dynamic random access memory, and maintain the working index in a non-volatile random access memory and/or flash storage.

To illustrate, a system with 48 10 terabyte disks 75% full of 1 MB minimal-sized segments has 360 million index entries and each entry is a 4 KB block. With a tree-structured index and 50 occupied entries per 4 KB index entry, the working index occupies approximately 30 GB. The leaf level is approximately 29 GB (360 million entries) and the next level is about 600 MB (7.2 million entries). Due to the size of these bottom two levels, these levels are maintained in flash storage. The remaining higher levels can be maintained in the non-volatile random access memory since they occupy about 13 MB.

The size of the entries is chosen as a compromise between being big enough to hold a useful content-to-overhead ratio and being small enough to hold down write-amplification (i.e., writing unchanged data along with every index change). As index entries are allocated, the durable file system assigns sequential numbers within their tree depth. For example, the first entry created is block 0 on level 1. When that entry is split, block 1 is appended to level 1, and a new entry is started as block 0 at level 2. The durable file system caches index entries in DRAM and spills to files in flash named by their tree depth. For example, block 37 at level 3 is found at offset 37×4 KB in a (first) file for level 3. The file could be named "L3-0," for example. Pointers in intermediate entries of the tree are these sequential integers into the next level. The durable file system does not relocate these pointers as the index moves through different zone sets. When a file for a level exceeds a size that can be efficiently packed into a zone set (e.g., 63 MB), the durable file system creates another file for the further blocks on that level, for example, "L3-1", "L3-2", etc.

An example leaf-level entry in the index includes:
the object's identifier;
the object's time stamp;
the object's segment identifier (a sequential integer);
time stamp when this index entry was created;
the length of each of the object's stored fragments;
zone set identifier; and
offset within the zone set where the segment's fragments are stored.

An example non-leaf entry in the index includes:
the segment key; and
a sequential integer, which is the ordinal number of the index block within the next level of the tree to which the entry points.

If a failure or other event occurs that corrupts the index or the index is lost, the index is restored from a previous snapshot of the index and from layout markers created after the index snapshot was created. The superblock identifies the location of the snapshot index.

Figure 7:
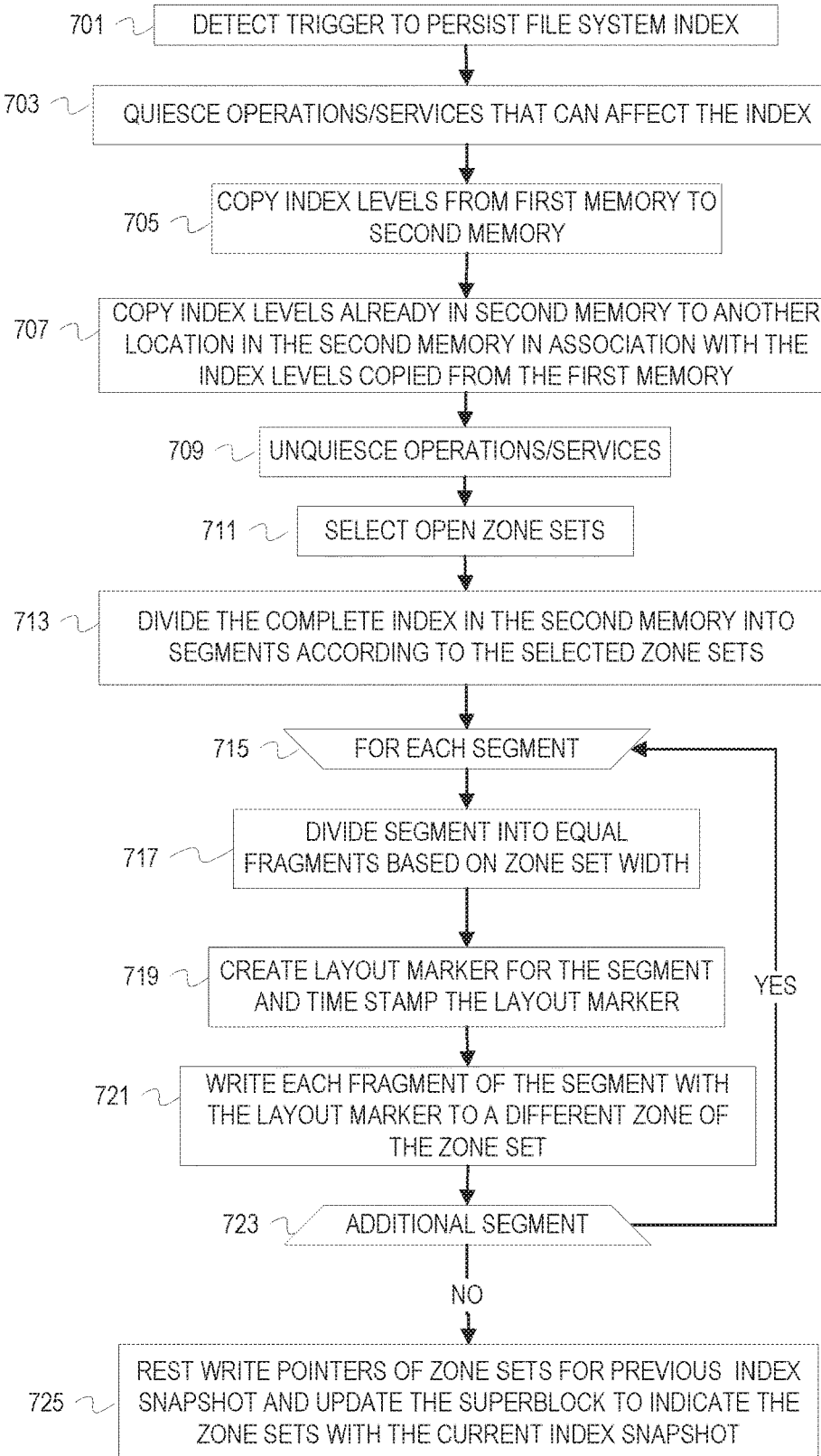
FIG. 7 depicts a flowchart of example operations for persisting the durable file system index.

FIG. 7 depicts a flowchart of example operations for persisting the durable file system index.

At block 701, the durable file system detects a trigger to persist the index. Example triggers for creating an index snapshot include expiration of a time period, a number of updates to the index, and a number of receive object requests.

At block 703, the durable file system quiesces operations/services that can affect the index. The durable file system can buffer results of writes to the storage devices, for instance. The durable file system can create a notification that no object requests will be handled during the quiesce. The durable file system can also pause a service responsible for space reclamation.

At block 705, the durable file system copies index levels from a first memory to a second memory. The first memory is faster than the second memory, but typically smaller than the second memory. In the earlier examples, the first memory is non-volatile random access memory (NVRAM) and the second memory is flash memory/storage. The file system index is divided across the different memories based on an assumption that the first memory is faster but not large enough to accommodate the entire index.

At block 707, the durable file system copies index levels already in the second memory to another location in the second memory in association with the index levels copied from the first memory. Effectively, the file system index is being coalesced into the larger second memory. In the earlier example, the leaf level and level above the leaf level are stored in flash memory. The file system maintains all other levels in NVRAM.

At block 709, the durable file system unquiesces the quiesced operations/services. The durable file system resumes servicing object requests and allows space reclamation to continue.

At block 711, the durable file system selects an open zone set. The durable file system can read the zone set information in the superblock to identify an open zone set.

At block 713, the durable file system divides the coalesced index (i.e., the whole index) in the second memory into segments according to the selected open zone set. Although a zone set could be defined that has sufficient space to host an index, the index is likely larger than one zone set.

At block 715, the durable file system begins processing each segment.

At block 717, the durable file system divides the segment into equal fragments based on zone set width. As with ingested objects, the index is striped across the constituent zones of the selected zone set.

At block 719, the durable file system creates a layout marker for the segment and time stamps the layout marker. The durable file system can create the layout marker to determine the following fragment.

At block 721, the durable file system writes each fragment with the layout marker prepended. Similar to an object fragment, the durable file system writes each index fragment with the prepended layout marker to independently accessible storage devices.

At block 723, the durable file system determines whether there is an additional segment to process. The durable file system can track progress through segments of the index with counters, pointers, etc. If there is an additional segment to process, then control returns to block 715. Otherwise, control flows to block 725.

At block 725, the durable file system resets the write pointers of the zone sets that host the previous index snapshot. The durable file system resets these write pointers after the current index snapshot has been recorded into the newly selected zone set. The durable file system resets the write pointers since the zone sets are limited to hosting index snapshot segments. Limiting a group of open zone sets for writing an index snapshot allows the index snapshot to be read more quickly (e.g., with a long sequential read) without the interruption of seeking ahead (i.e., skipping over non-index snapshot fragments). However, the durable file system can mix fragments of different types in a zone set and record content type information into the layout markers to distinguish them. The durable file system also updates the superblock to indicate the zone sets where the current index snapshot has been written.

Figure 8:
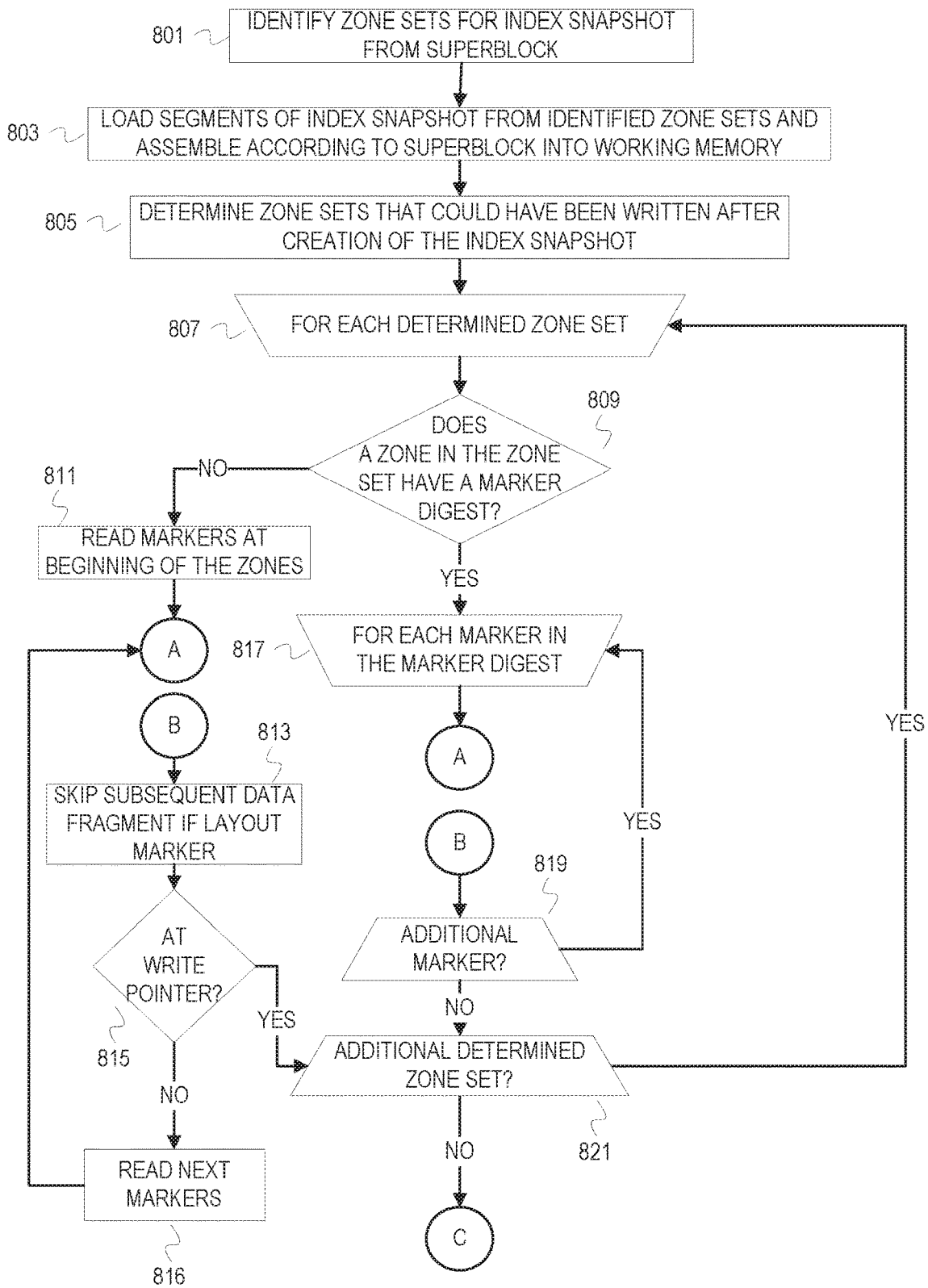
FIGS. 8-9 depict a flowchart of example operations for reconstructing a durable file system index.
Figure 9:
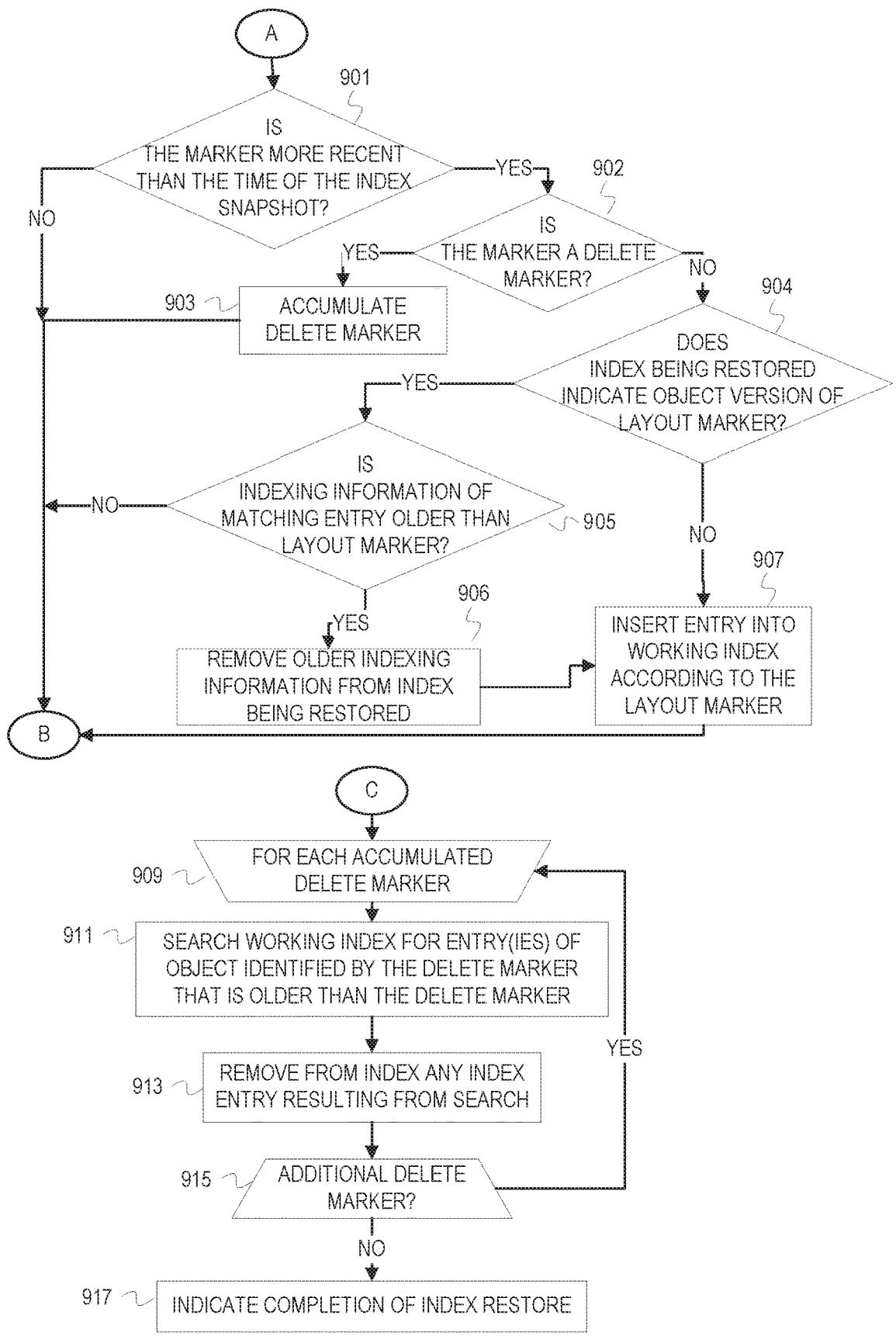

FIGS. 8-9 depict a flowchart of example operations for reconstructing a durable file system index. The index reconstruction can be considered to have multiple phases. In a first phase, the most recent index snapshot is retrieved. In a second phase, the durable file system updates the retrieved index snapshot with indexing information in layout markers created after the retrieved index snapshot. In a third phase, the durable file system applies delete markers to the index.

At block 801, the durable file system identifies zone sets that contain an index snapshot from the superblock. The superblock indicates a time stamp for the index snapshot and zone set identifiers for the zone sets that contain the index snapshot.

At block 803, the durable file system loads segments of the index snapshot from the identified zone sets into working memory. The durable file system assembles the index snapshot segments in accordance with the superblock information. The superblock can explicitly indicate order of the index snapshot segments or the order of assembly can be implied with order of the zone set identifiers in the superblock.

At block 805, the durable file system determines zone sets that could have been written after creation of the index snapshot. The durable file system makes this determination with the zone set information and the creation time of the index snapshot indicated in the superblock. With the zone set information, the durable file system determines zone sets that are indicated as open and zone sets indicated as closed with a close time after the index snapshot creation time. The durable file system can disregard empty zone sets and zone sets closed prior to the snapshot creation time.

At block 807, the durable file system begins processing each of the determined zone sets to find layout markers created after the index snapshot.

At block 809, the durable file system determines whether a zone in the zone set being processed has a marker digest. The durable file system can read data from physical sectors preceding the write pointer until the durable file system can determine whether the read data constitutes a marker digest. Although the zone set should be indicated as closed, the system may have been interrupted prior to the zone set state being updated and after the marker digest was written. In addition, an event may have prevented the marker digest from being written to all of the constituent zones of the zone set. But the durable file system can use the marker digest found in one of the constituent zones to determine creation dates of each marker within the zone. If none of the constituent zones includes a marker digest, then control flows to block 811. If at least one of the constituent zones includes a marker digest, control flows to block 817.

At block 817, the durable file system begins processing each marker in the marker digest. Control flows from block 817 to block 901 of FIG. 9.

At block 901 of FIG. 9, the durable file system determines whether the marker being processed is more recent than the creation time of the index snapshot. The marker in the marker digest will have a time stamp that indicates its creation time. The durable file system compares this time stamp against the index snapshot time stamp in the superblock. If the marker is more recent, then control flows to block 903. If the marker is not more recent, then it is already represented in the index snapshot and control flows to 819 of FIG. 8.

At block 902, the durable file system determines whether the marker being processed is a delete marker or a layout marker. The marker can explicitly identify itself as a layout marker or a delete marker, or the marker can be identified as a delete marker by the absence of the indexing information recorded in a layout marker (e.g., absence of any one of a zone set identifier, fragment size, etc.). If the marker is a delete marker, then control continues to block 903. If the marker is a layout marker, then control flows to block 904.

At block 903, the durable file system accumulates the delete marker. For example, the durable file system adds the delete marker to a list of delete markers that have been encountered during the index restoration. The durable file system applies these delete markers to the index in working memory after the proper layout markers have been applied. Control flows from block 903 to block 819 of FIG. 8.

If the marker is a layout marker which identifies an object version, then, at block 904, the durable file system determines whether the index indicates the object version identified by the layout marker. The durable file system searches the working index being restored with the object version key (i.e., the client defined object identifier and object time stamp in the layout marker). The look up or search result will indicate matching entries in the working index. If the results are null or empty, then the index being restored does not have yet indicate any version of the object and control flows to block 907. If a result or results indicate a same object version (i.e., same object identifier and same object time stamp), then control flows to block 905.

If there is one or more matching results, then, at block 905, the durable file system determines whether the matching result(s) indicates indexing information that is older than the indexing information in the layout marker. The durable file system compares a time stamp for the indexing information from the matching entry(ies) to a time stamp of the layout marker (i.e., a time stamp corresponding to when the layout marker was created) to determine which is more recent. Since markers can be moved among zones (e.g., for space reclamation), object version fragments may exist in multiple locations with different indexing information. If the layout marker has the most recent indexing information for the object version, then control flows to block 906. If the working index already has more recent indexing information, then control flows to block 819 of FIG. 8.

At block 906, the durable file system removes indication(s) of the older indexing information from the index being restored. In some embodiments, the durable file system records information to indicate the amount of invalid data available for reclamation based on the indexing information being removed. The durable file system can record information that indicates the older indexing information and associated data fragment is invalid. This information can later be used to estimate potential yield of a zone when evaluating zones for space reclamation. Control flows to block 907 for the durable file system to update the index with the indexing information of the layout marker.

At block 907, the durable file system updates the index in working memory (i.e., the index being restored) according to the layout marker. The durable file system adds an entry that indicates the segment key in the layout marker, the fragment size, etc. Control flows from block 907 to block 819 of FIG. 8.

At block 819, the durable file system determines whether there is an additional marker to process. If there is an additional marker in the marker digest to process, then control flows to block 817. If the durable file system has traversed the marker digest, then control flows to block 821.

At block 821, the durable file system determines whether there is an additional determined zone set yet to be processed. In other words, the durable file system determines whether there is another yet to be processed zone set that may have been written to after creation of the index snapshot. If there is an additional determined zone set, then control returns to block 807. If not, then control flows to block 909 in FIG. 9.

If there was no marker digest in any one of the constituent zones of the determined zone set (809), then the durable file system scans the constituent zones for markers. At block 811, the durable file system reads markers at the beginning of the constituent zones. Since the markers should be redundant copies, the durable file system can read any one after selecting a valid one (e.g., using the marker checksum). Control flows from block 811 to block 901. The operations represented by blocks 901-907 have already been described. But control flows to 813 instead of 819 when the durable file system is scanning the constituent zones instead of using a marker digest.

At block 813, the durable file system skips the fragment that follows the marker in each zone if the marker is a layout marker. If the marker is a layout marker, then the durable file system can seek ahead based on the fragment size in the layout marker. If the marker is a delete marker, then a data fragment does not follow the delete marker.

At block 815, the durable file system determines whether it has read to the write pointer. If the durable file system has read to the write pointer, then control flows to block 821. If not, then control flows to block 816.

At block 816, the durable file system reads the next markers across the constituent zones of the determined zone set. If the durable file system encountered delete markers (811), then the durable file system can continue reading from the end of the delete marker. If the durable file system encountered layout markers (811), then the durable file system skipped the subsequent data fragments (813) and reads the markers that follow the skipped data fragments. Control flows from block 816 to block 901 of FIG. 9.

If the durable file system has processed the determined zone sets, then the durable file system begins processing the accumulated delete markers at block 909. The durable file system may have accumulated the delete markers in a buffer, queue, or array.

At block 911, the durable file system searches the working index (i.e., the index in working memory) entries that reference an object older than the delete marker being processed. The durable file system searches for one or more entries that have a key prefix matching an object identifier in the delete marker being processed. For each matching entry, the durable file system determines whether the segment key indicates an object time stamp that is older than the delete marker time stamp.

At block 913, the durable file system removes any entries resulting from the search. For each entry indicating a key prefix that matches the delete marker's object identifier and indicating an object time stamp older than the delete marker's time stamp, the durable file system performs a remove operation on the index. This ensures that the index contains no versions of the object older than the delete request.

At block 915, the durable file system determines whether there is an additional delete marker to process. If so, control returns to block 909. If the accumulated delete markers have been processed, then the durable file system indicates completion of the index restore at block 917. For instance, the durable file system generates a notification or sets a value that indicates the file system is available.

Space Reclamation

With the use of delete markers, space occupied by "deleted" object data may not be recovered immediately. With this delayed space reclamation, the durable file system can evaluate closed zone sets for space reclamation over time. The durable file system can use a background process to examine constituent zones of a closed zone set and select zone sets based on various characteristics for efficient space reclamation. When a zone set is selected, the background process can copy active data (e.g., active object fragments, an active delete marker, etc.) to a target zone set. When a zone no longer contains active data, the background process can reset the write pointer of the zone and indicate the zone as empty.

Figure 10:
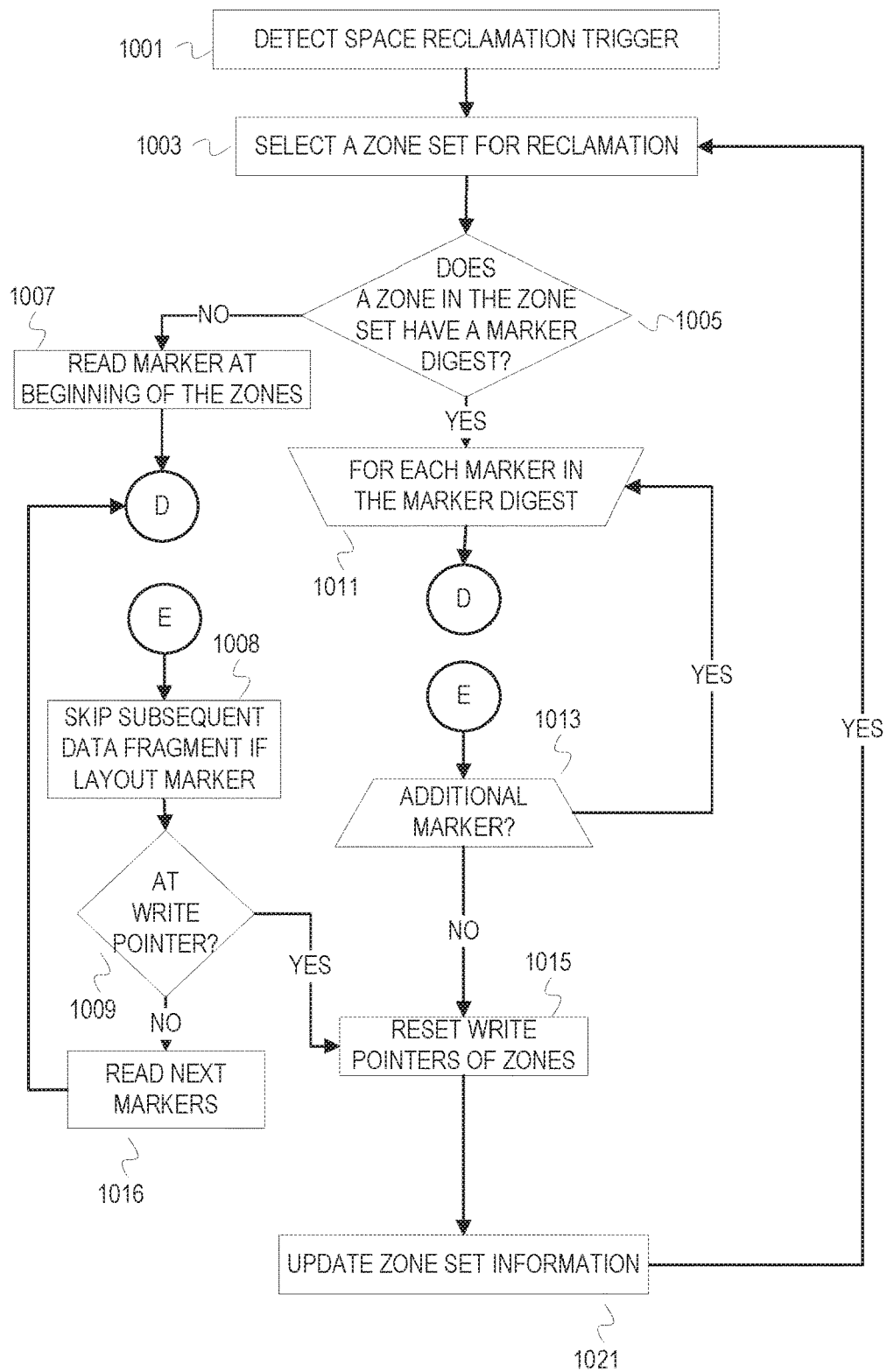
FIGS. 10-11 depict a flowchart of example operations for space reclamation for the durable file system.
Figure 11:
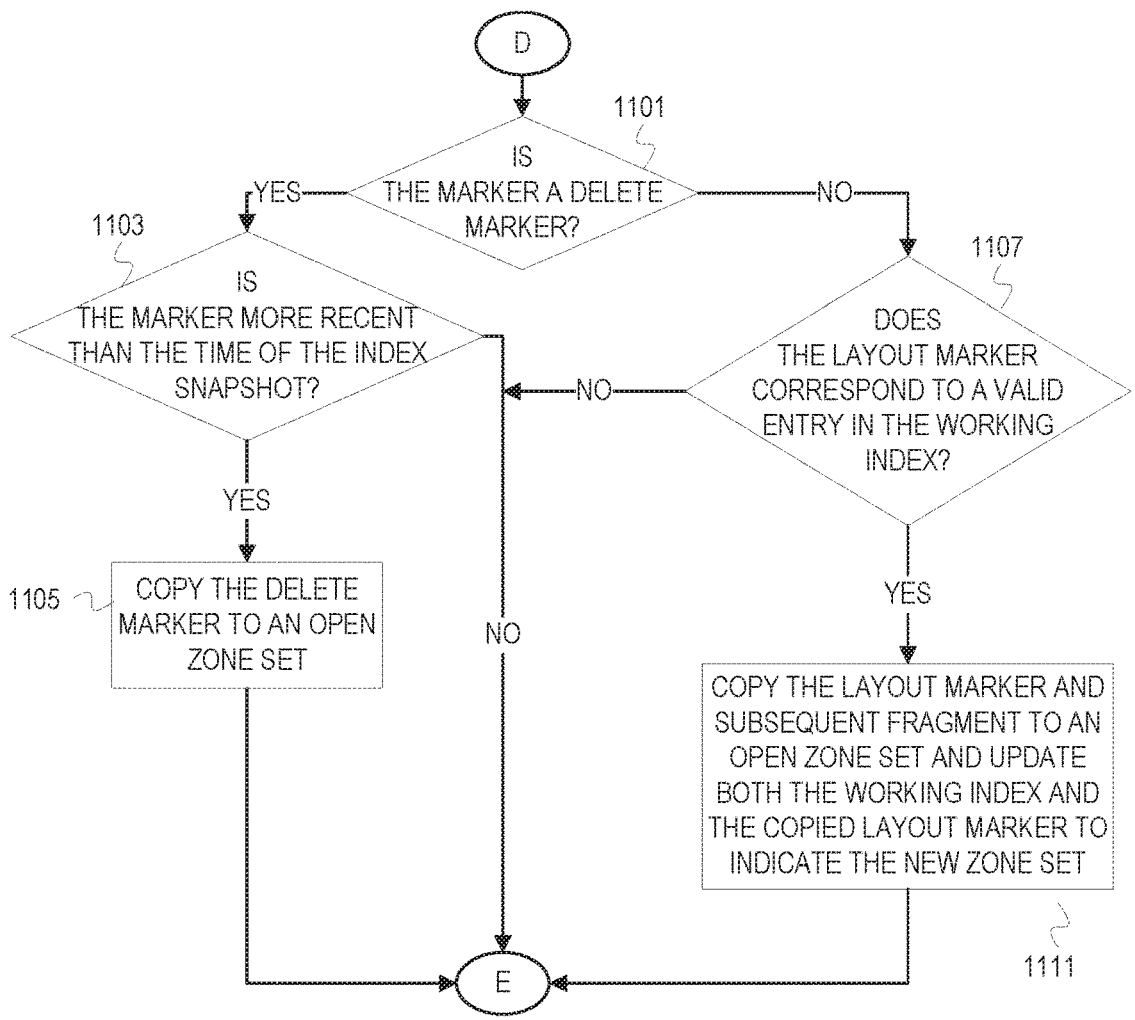

FIGS. 10-11 depict a flowchart of example operations for space reclamation for the durable file system. The operations in FIG. 10 for accessing and traversing a marker digest or markers throughout a zone are similar to those in FIG. 8. FIGS. 10-11 refer to a "space reclamation process" as performing the operations. This process can be a background process controlled/managed by the durable file system. The space reclamation process could also be a separate process invoked by the durable file system.

At block 1001, a space reclamation process detects a reclamation trigger. Examples of the reclamation trigger include expiration of a period of time, falling below a minimum number of zones in a zone pool, an acceleration in write requests, etc. The durable file system may have an ongoing space reclamation process that runs as a background process, in which case the trigger would be start of the durable file system.

At block 1003, the space reclamation process selects a zone set for reclamation. The space reclamation processes selects a zone set indicated as closed in the zone set information of the superblock. The space reclamation process can select each zone set as encountered (e.g., traversing the zone set information in the superblock), or select based on one or more criteria. A selection criterion can relate to when the zone set was closed, when the zone set was created, information about the corresponding disks (e.g., health of the disks), etc. The space reclamation process may select a zone set for space reclamation based on potential space yielded from the reclamation. The space reclamation process can estimate potential space yielded for a particular zone with a marker digest of the zone or the layout markers in the zone. Each layout marker indicates a size of an object fragment and size of the zone can be determined with the zone set information. The space reclamation process can sum the fragment sizes indicated in the layout markers, either located throughout the zone or in the marker digest. The space reclamation process then determines potential yield with the total fragment sizes, the layout marker sizes, and the size of a zone. In addition, the durable file system can maintain values in the index. When the index is updated with information for an ingested object, the size of the object can be used to update the value that indicates available (or used) amount of a zone. When a delete request is completed, the space reclamation process can update the index to indicate an amount of space that will be freed with the delete. If the index includes information that indicates available space in a closed set of zones, then the durable file system can identify that set of zones to the space reclamation process. In some embodiments, the space reclamation process evaluates at least one of the layout markers in a zone's marker digest to determine whether they correspond to any invalid data. If the index does not have indexing information matching the layout marker, then the corresponding object fragment is invalid. That is, the object fragment was deleted or that version of the object was replaced by a more recent version, written elsewhere.

At block 1005, the space reclamation process determines whether a zone in the selected zone set has a marker digest. The space reclamation process can read data from physical sectors preceding the write pointer until the space reclamation process can determine whether the read data constitutes a marker digest. If none of the constituent zones includes a marker digest, then control flows to block 1007. If at least one of the constituent zones includes a marker digest, control flows to block 1011.

At block 1011, the space reclamation process begins processing each marker in the marker digest. Control flows from block 1011 to block 1101 of FIG. 11.

At block 1101, the space reclamation process determines whether the marker being processed is a delete marker or a layout marker. The marker can explicitly identify itself as a layout marker or a delete marker, or the marker can be identified as a delete marker by the absence of the indexing information recorded in a layout marker (e.g., absence of any one of a zone set identifier, fragment size, etc.). If the marker is a delete marker, then control continues to block 1105. If the marker is a layout marker, then control flows to block 1107.

At block 1103, the space reclamation process determines whether the delete marker is more recent than the creation time of the index snapshot. The delete marker in the marker digest will have a time stamp that indicates its creation time. The space reclamation process compares this time stamp against the index snapshot time stamp in the superblock. If the delete marker is more recent, then control flows to block 1105. If the delete marker is not more recent, then it is already represented in the index snapshot and is no longer active data. In the case of the delete marker being inactive data, control flows to 1013 of FIG. 10.

At block 1105, the space reclamation process copies the delete marker to an open zone set. The space reclamation process writes the delete marker in each zone of the zone set. Control flows from block 1105 to block 1013.

If the marker is determined to be a layout marker (1101), then the space reclamation process determines whether the layout marker corresponds to a valid entry in the working index at block 1107. The space reclamation process reads a key (e.g., segment key) from the layout marker data and accesses the working index with the key. If a match if found, then the layout marker has a corresponding valid entry in the working index (i.e., the index references the object segment/fragment identified by the layout marker). If the layout marker corresponds to a valid entry in the working index, then control flows to block 1111. Otherwise, the space reclamation process skips over the layout marker and subsequent object fragment and control flows to block 1013.

At block 1111, the space reclamation process copies the layout marker and the subsequent object fragment to the open zone set. The space reclamation process also updates both the copied layout marker and the working index to indicate the new zone set. Since the space reclamation process does not perform any write to the zone set being reclaimed, space reclamation is idempotent. If space reclamation is interrupted before completion, the zone set being reclaimed is still available for recovery and still includes all of the active data. The index has not been updated to reference the new location of the active data, so the copied data will be treated as inactive data. After the system recovers and space reclamation resumes, the active data can be copied again without impacting consistency of the file system. Control flows from block 1111 to block 1013.

At block 1013, the space reclamation process determines whether there is an additional marker to process. If there is an additional marker in the marker digest to process, then control flows to block 1011. If the space reclamation process has traversed the marker digest, then control flows to block 1015.

If there was no marker digest in any one of the constituent zones of the selected zone set (1005), then the space reclamation process scans the constituent zones for markers. At block 1007, the space reclamation process reads markers at the beginning of the constituent zones. Since the markers should be redundant copies, the durable file system can read any one after selecting a valid one (e.g., using the marker checksum). Control flows from block 1007 to block 1101. The operations represented by blocks in FIG. 11 have already been described. But control flows to 1008 instead of 1013 upon exit from FIG. 11 when the space reclamation process is scanning the constituent zones instead of using a marker digest.

At block 1009, the space reclamation process determines whether it has read to the write pointer. If the space reclamation process has read to the write pointer, then control flows to block 1015. If not, then control flows to block 1016.

At block 1016, the space reclamation process reads the next markers across the constituent zones of the selected zone set. If the space reclamation process encountered delete markers, then the space reclamation process can continue reading from the end of the delete marker. If the space reclamation process encountered layout markers, then the space reclamation process skipped the subsequent data fragments (1008) and reads the markers that follow the skipped data fragments. Control flows from block 1016 to block 1101 of FIG. 11.

At block 1015, the space reclamation process resets the write pointers of the zone set. The space reclamation process at this point has copied active data to a new zone set and can reset the write pointers of the constituent zones to the beginning of the zones.

At block 1021, the space reclamation process updates the zone set information in the superblock to indicate the new state of the reclaimed zone set. The space reclamation process can set the state of the reclaimed zone set to empty or open. The space reclamation process can also dissolve the zone set and return the zones to a zone pool to allow the zones to become members of a different zone set.

Variations

Although the example illustrations refer to zones and write pointers, these are not required. The durable file system can interact with storage media that do not maintain writer pointers to indicate a current write location. For instance, the durable file system or a separate program (e.g., driver or add-on program) can use addressing information supplied by the storage media to track a current location for continued writing to the storage media. In addition, a durable file system can write across a group of sequential units of a storage device (e.g., a page, plane, or block) instead of relying on identification of zones.

Many of the illustrations herein refer to an SMR implementation that may be host managed or host aware. However, this disclosure is not limited to a host managed SMR implementation—the host being the device/machine/computer that hosts the file system (i.e., runs the file system program code). A durable file system according to this disclosure can be implemented on SMR storage devices that are not host managed and on other types of storage devices that do not have self-imposed write constraints, such as a solid state device with flash memory (flash storage). To illustrate, a durable file system can perform writes to a flash storage array with a sequential write paradigm of large sizes, which can achieve better performance of the flash storage array than random and/or small writes. Rather than using zones presented by target storage devices, the file system can write to a sequence of storage units of a storage device ("storage unit sequence"), such as a sequence or range of blocks, and track a last block written instead of relying on the device to maintain a write pointer. The number of blocks in the set of blocks can be established dynamically based on the specifications of the target storage device (e.g., the size, alignment, and interleaving of internal erase blocks in a flash storage device). To limit metadata overhead, the file system can choose the same set of blocks by logical block address across the target storage devices. For example, a file system instance may logically divide each of 8 flash storage drives into block ranges of 1,000 blocks and manage each block range as if it were an SMR zone. The file system can stripe an object across the 8 flash drives by specifying that each fragment of an object is to be written to the block range that begins at logical block number (LBN) 2,000 and ends at LBN 2,999 on each flash drive. If the object fragment and layout marker blocks do not fill the block range, then the file system instance can update the superblock to indicate the LBN at which writing ended.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 12:
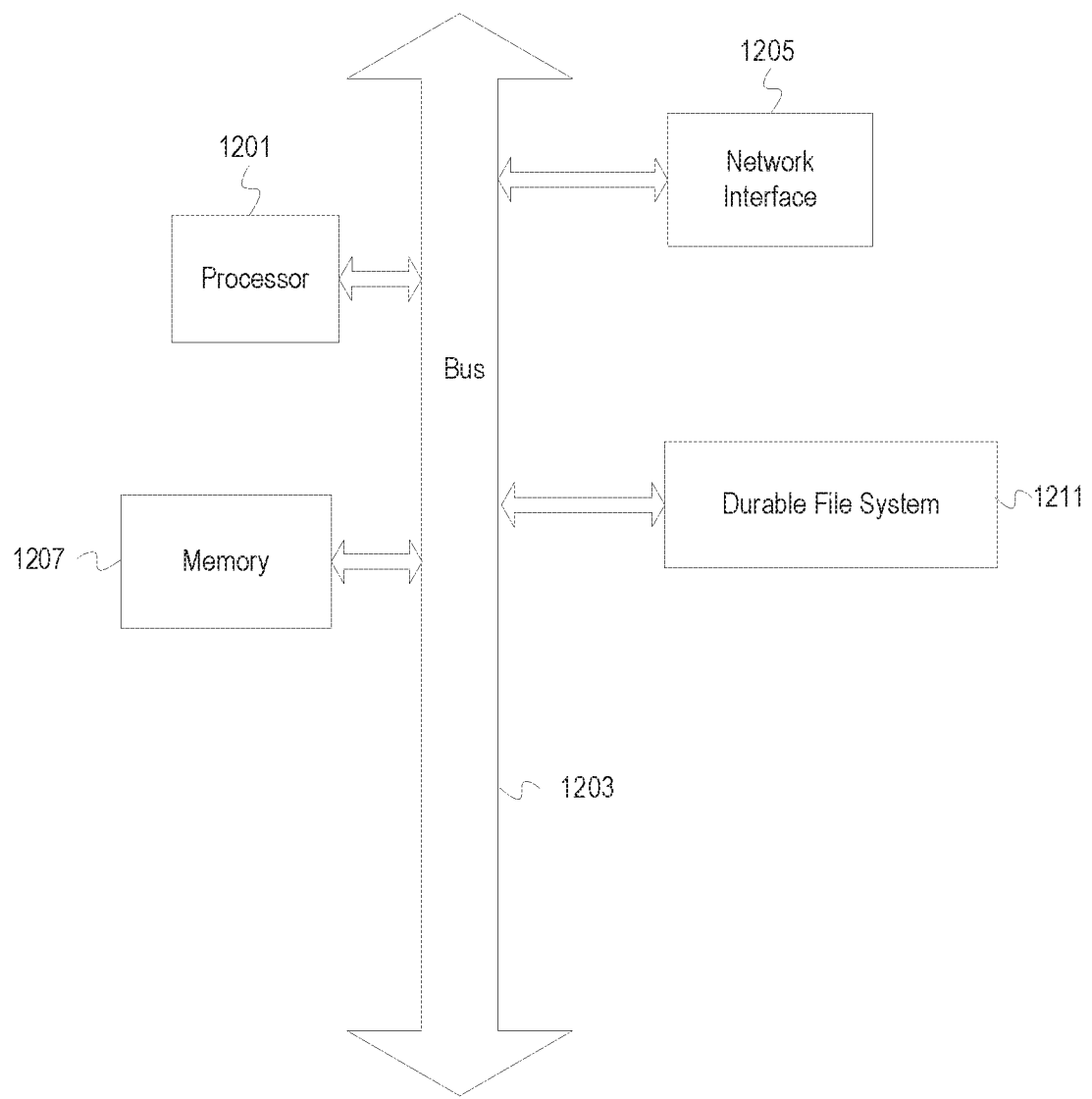
FIG. 12 depicts an example computer system with a durable file system installed.

FIG. 12 depicts an example computer system with a durable file system installed. The computer system includes a processor unit 1201 (possibly including multiple processors, multiple cores, multiple nodes, and/or implementing multi-threading, etc.). The computer system includes memory 1207. The memory 1207 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1203 (e.g., PCI, ISA, PCI-Express, HyperTransport® bus, InfiniBand® bus, NuBus, etc.) and a network interface 1205 (e.g., a Fiber Channel interface, an Ethernet interface, an internet small computer system interface, SONET interface, wireless interface, etc.). The system also includes the durable file system 1211. The durable file system 1211 manages organization and access of object data across a zone set for durability of the object data. The durable file system 1211 ingests and retrieves objects from across zone sets and uses layout markers to navigate zone sets efficiently. The durable file system 1211 persists layout markers prior to updating a working file system index with the object indexing information in the layout marker. The durable file system 1211 also employs delete markers to efficiently effectuate a delete request in the time it takes to update the working index to reflect the index. The durable file system 1211 also has any one of the functionalities already described in the disclosure. Any one of the previously described functionalities may be partially (or entirely) implemented in hardware and/or on the processor unit 1201. For example, the functionality may be implemented with an application specific integrated circuit, in logic implemented in the processor unit 1201, in a co-processor on a peripheral device or card, etc. Further, realizations may include fewer or additional components not illustrated in FIG. 12 (e.g., video cards, audio cards, additional network interfaces, peripheral devices, etc.). The processor unit 1201 and the network interface 1205 are coupled to the bus 1203. Although illustrated as being coupled to the bus 1203, the memory 1207 may be coupled to the processor unit 1201.

While the aspects of the disclosure are described with reference to various implementations and exploitations, it will be understood that these aspects are illustrative and that the scope of the claims is not limited to them. In general, techniques for managing organization and access of data to withstand interruptions or failures in write constrained storage as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

TERMINOLOGY

The term "disk" is commonly used to refer to a disk drive or storage device. This description uses the term "disk" to refer to one or more platters that are presented with a single identifier (e.g., drive identifier). The disclosure uses the term "concurrently" to describe actions overlapping in time and should not be construed more strictly to require any associated actions to begin or occur at an exact same time, although concurrent action can occur or begin at a same time.

What is claimed is:

1. A method comprising:
generating, by a file system, a plurality of fragments from an object in response to receipt of a request from a client to write the object into a file system instance, the object identified by an object identifier, and each fragment of the plurality of fragments being of equal size to each other;
creating, by the file system, indexing information for the object that identifies the object and a same range of logical block numbers for each of the plurality of fragments;
writing, by the file system, each fragment from the plurality of fragments with the indexing information into a different storage device of a plurality of storage devices that each present a respective zone for storage, wherein each fragment from the plurality of fragments is written into the same range of logical block numbers within each of the different storage devices, and wherein the indexing information in each one of the different storage devices identifies a same last logical block number at the same range of logical block numbers written within each respective zone of each of the different storage devices;
updating, by the file system after the writing, an index log of the file system instance with the indexing information; and
tracking the same last logical block number written within each respective zone for the plurality of fragments.

2. The method of claim 1 further comprising:
in response to a determination that the index log includes an entry that references a second range of logical block numbers with an older version of the object, removing the entry from the index log.

3. The method of claim 1 further comprising:
searching the index log for a key prefix that matches the object identifier of the object, wherein keys of the index log comprise a client defined object identifier, a time stamp of when the object arrived, and a fragment identifier.

4. The method of claim 1, further comprising:
determining that the index log includes an entry with a key prefix that matches the object identifier, an index key of the entry comprising an object arrival time stamp that is older than a time stamp of when the object arrived.

5. The method of claim 1 further comprising:
wherein generating the plurality of fragments includes dividing the object equally to generate a first segment corresponding to the same range of logical block numbers and a second segment corresponding to the same range of logical block numbers.

6. The method of claim 1, wherein the indexing information includes a size of an individual one of the plurality of fragments.

7. The method of claim 1, wherein the writing further comprises:
including, with writing the plurality of fragments, data protection information.

8. The method of claim 1, wherein the creating further comprises:
creating information that comprises a client defined identifier of the object, an arrival time stamp for the object, and an identifier of the same range of logical block numbers.

9. The method of claim 1 further comprising:
reading, in response to a read request that indicates the object identifier, at least a subset of the plurality of fragments in accordance with storage device identifiers corresponding to the same range of logical block numbers.

10. A non-transitory machine readable medium having stored thereon instructions for managing access and organization of objects, the instructions which when executed by at least one machine, causes the machine to:
select a range of logical block numbers to store an object, wherein the range of logical block numbers is the same on each independently accessible storage device of a plurality of storage devices that each presents a respective zone for storage that the range of logical block numbers is within;
add same indexing information to each of different fragments of the object of substantially equal size to each other to form a plurality of indexed fragments, wherein the same indexing information comprises a client defined object identifier of the object, and the same indexing information in each one of the storage devices identifies a same last logical block number within the range of logical block numbers at each independently accessible storage device;
write each of the plurality of indexed fragments across the range of logical block numbers of each respective independently accessible storage device of the plurality of storage devices;
update a file system index with the same indexing information after writing the indexed fragments; and
tracking the same last logical block number written within each respective zone for the plurality of indexed fragments.

11. The non-transitory machine readable medium of claim 10 further comprising instructions to:
read, in response to a read request that indicates the client defined object identifier, at least a subset of the plurality of indexed fragments in accordance with storage device identifiers corresponding to the last block written.

12. A computing device comprising:
a memory containing machine readable medium comprising machine executable code for managing access and organization of objects; and
a processor coupled to the memory, the processor configured to execute the machine executable code to cause the computing device to:
generate a plurality of fragments from an object in response to receipt of a request to write the object, into a file system instance, the object identified by an object identifier, and each fragment of the plurality of fragments being of substantially equal size to each other;
create, by the file system, indexing information for the object that identifies the object and a same range of logical block numbers for each of the plurality of fragments;
write each fragment from the plurality of fragments with the indexing information into a different storage device of a plurality of storage devices that each present a respective zone for storage, wherein each fragment from the plurality of fragments is written into the same range of logical block numbers within each of the different storage devices, and wherein the indexing information in each one of the different storage devices identifies a same last logical block number at the same range of logical block numbers written within each respective zone of each of the different storage devices;
update, after writing the plurality of fragments and the indexing information, an index log of the file system instance with the indexing information; and
tracking the same last logical block number written within each respective zone for the plurality of fragments.

13. The computing device of claim 12, further comprising machine executable code to cause the computing device to:
in response to a determination that the index log includes an entry that references a second range of logical block numbers with an older version of the object, remove the entry from the index log.

14. The computing device of claim 12, further comprising machine executable code to cause the computing device to:
search the index log for a key prefix that matches the object identifier of the object, wherein keys of the index log comprise a client defined object identifier, a time stamp of when the object arrived, and a fragment identifier.

15. The computing device of claim 12, further comprising machine executable code to cause the computing device to:
determine that the index log includes an entry with a key prefix that matches the object identifier, an index key of the entry comprising an object arrival time stamp that is older than a time stamp of when the object arrived.

16. The computing device of claim 12, further comprising machine executable code to cause the computing device to:
generate a time stamp that corresponds to when the object arrived at the computing device.

17. The computing device of claim 12, further comprising machine executable code to cause the computing device to:
divide the object into a first segment corresponding to the range of logical block numbers and a second segment corresponding to the same range of logical block numbers.

18. The computing device of claim 12, wherein the indexing information includes a size of an individual one of the plurality of fragments.

19. The computing device of claim 12, further comprising machine executable code to cause the computing device to:
   include, with the plurality of fragments, data protection information.

\* \* \* \* \*